US007646872B2

(12) United States Patent
Brown et al.

(10) Patent No.: US 7,646,872 B2
(45) Date of Patent: Jan. 12, 2010

(54) SYSTEMS AND METHODS TO SECURELY GENERATE SHARED KEYS

(75) Inventors: Michael K. Brown, Peterborough (CA); Herbert A. Little, Waterloo (CA); David Victor MacFarlane, Waterloo (CA); Michael S. Brown, Waterloo (CA); Dinah Lea Marie Davis, Kitchener (CA)

(73) Assignee: Research In Motion Limited, Waterloo (CA)

( * ) Notice: Subject to any disclaimer, the term of this patent is extended or adjusted under 35 U.S.C. 154(b) by 947 days.

(21) Appl. No.: 11/118,236

(22) Filed: Apr. 29, 2005

(65) Prior Publication Data
US 2005/0251680 A1 Nov. 10, 2005

Related U.S. Application Data

(63) Continuation-in-part of application No. 11/093,954, filed on Mar. 30, 2005.

(60) Provisional application No. 60/559,092, filed on Apr. 2, 2004, provisional application No. 60/559,646, filed on Apr. 5, 2004, provisional application No. 60/566,790, filed on Apr. 30, 2004.

(51) Int. Cl.
H04K 1/00 (2006.01)
(52) U.S. Cl. .................................................. 380/277
(58) Field of Classification Search ................. 380/247, 380/277; 713/182
See application file for complete search history.

(56) References Cited

U.S. PATENT DOCUMENTS 5,953,420 A 9/1999 Matyas, Jr. et al.

6,002,769 A 12/1999 McGough (Continued)

FOREIGN PATENT DOCUMENTS

EP 1079565 2/2001

(Continued)

OTHER PUBLICATIONS

International Search Report of Application No. PCT/CA2005/000676, date of mailing Aug. 22, 2005—15 pgs.

(Continued)

Primary Examiner—Ellen Tran
(74) Attorney, Agent, or Firm—Jones Day; Krishna K. Pathiyal; Robert C. Liang

(57) ABSTRACT

A method for secure bidirectional communication between two systems is described. A first key pair and a second key pair are generated, the latter including a second public key that is generated based upon a shared secret. First and second public keys are sent to a second system, and third and fourth public keys are received from the second system. The fourth public key is generated based upon the shared secret. A master key for encrypting messages is calculated based upon a first private key, a second private key, the third public key and the fourth public key. For re-keying, a new second key pair having a new second public key and a new second private key is generated, and a new fourth public key is received. A new master key is calculated using elliptic curve calculations using the new second private key and the new fourth public key.

19 Claims, 9 Drawing Sheets

U.S. PATENT DOCUMENTS

| | | | |
|---|---|---|---|
| 6,226,383 | B1 | 5/2001 | Jablon |
| 6,367,009 | B1 | 4/2002 | Davis |
| 6,445,797 | B1 | 9/2002 | McGough |
| 6,718,467 | B1 | 4/2004 | Trostle |
| 6,934,392 | B1 | 8/2005 | Vanstone |
| 7,076,061 | B1 * | 7/2006 | Lenstra et al. ............ 380/44 |
| 7,328,282 | B2 * | 2/2008 | Ganesan et al. ........... 709/246 |
| 7,382,882 | B1 * | 6/2008 | Immonen ................ 380/270 |
| 2001/0021256 | A1 | 9/2001 | Menezes |
| 2002/0126850 | A1 * | 9/2002 | Allen et al. .............. 380/277 |
| 2003/0026433 | A1 | 2/2003 | Matt |
| 2003/0072059 | A1 | 4/2003 | Thomas et al. |
| 2004/0073795 | A1 * | 4/2004 | Jablon .................... 713/171 |
| 2006/0236384 | A1 * | 10/2006 | Lindholm et al. ........... 726/10 |

FOREIGN PATENT DOCUMENTS

| | | |
|---|---|---|
| WO | WO2006/048043 | 5/2006 |

OTHER PUBLICATIONS

U.S. Appl. No. 11/962,181, filed Dec. 21, 2007.
U.S. Appl. No. 11/962,189, filed Dec. 21, 2007.
Extended European Search Report for EP Application 07124018.
Extended European Search Report for EP Application 07124019.
Printout from wikipedia.org entitled "Speke", downloaded Mar. 12, 2008.
Printout from wikipedia.org entitled "Shanks-Tonelli Algorithm", downloaded Mar. 12, 2008.
Printout from wikipedia.org entitled "Legendre Symbol", downloaded Mar. 12, 2008.
Printout from wikipedia.org entitled "Elliptic Curve Cryptography", downloaded Mar. 12, 2008.
Printout from wikipedia.org entitled "Diffie-Hellman Key Exchange", downloaded Mar. 12, 2008.
"The SPEKE Password-Based Key Agreement Methods", D. Jablon, Phoenix Technologies, Oct. 22, 2003, downloaded on Mar. 12, 2008 from http://tools.ietf.org/html/draft-jablon-speke-02.
"The SSL Protocol Version 3.0", Transport Layer Security Working Group, Internet-Draft, Alan O. Freier et al, downloaded on Mar. 12, 2008 from http://wp.netscape.com/eng/ss13/draft302.txt.
S. Blake-Wilson et al, "Elliptic Curve Cryptography (ECC) Cipher Suites for Transport Layer Security (TLS)", May 2006.
D E Denning et al: "Timestamps In Key Distribution Protocols" Communications of the Association for Computing Machinery, ACM, New York, NY, US, vol. 24, No. 8, (Jan. 1, 1981), pp. 533-536, XPOO0907070, ISSN: 0001-0782.

* cited by examiner

US 7,646,872 B2

SYSTEMS AND METHODS TO SECURELY GENERATE SHARED KEYS

CROSS-REFERENCE TO RELATED APPLICATIONS

This application claims the benefit of and is a continuation-in-part of U.S. patent application Ser. No. 11/093,954 filed on Mar. 30, 2005 ("Deploying and Provisioning Wireless Handheld Devices" by Herb Little and Michael K. Brown) which claims the benefit of U.S. Provisional Application No. 60/559,092 filed Apr. 2, 2004 and U.S. Provisional Application No. 60/559,646 filed Apr. 5, 2004. This application also claims the benefit of U.S. Provisional Application No. 60/566,790 filed on Apr. 30, 2004. The contents of each of these applications are incorporated herein by reference.

BACKGROUND

1. Technical Field

This application relates to an apparatus and method of establishing an authentic and secure relationship between two messaging systems to exchange data. More specifically this application describes an apparatus and method of establishing an authentic relationship between a wireless handheld device ("mobile device") and a message center or host system using password-based authentication methods. The apparatus and method described herein is applicable to land-line environments as well as wireless environments.

2. Background of the Art

There are several strong password-based encryption mechanisms currently known in the computer industry. Some of these implementations include Encrypted Key Exchange (EKE), Password Derived Moduli (PDM), and Simple Password-authenticated Exponential Key Exchange (SPEKE). These mechanisms are limited in their implementations and have not addressed the need of mobile devices. Additionally these mechanisms do not address the need of implementing perfect forward secrecy, such that if a security breach does take place all previous messages exchanged remain secure. A protocol provides perfect forward secrecy if past session keys are not compromised even if the long-term keys are compromised. (See, e.g., Menezes et al., Handbook of Applied Cryptography, 1996, p. 496). Perfect forward secrecy, also known as break-backward protection, means that all previous securely exchanged messages should remain secure despite anything that happens in the future.

DETAILED DESCRIPTION

Figure 1:
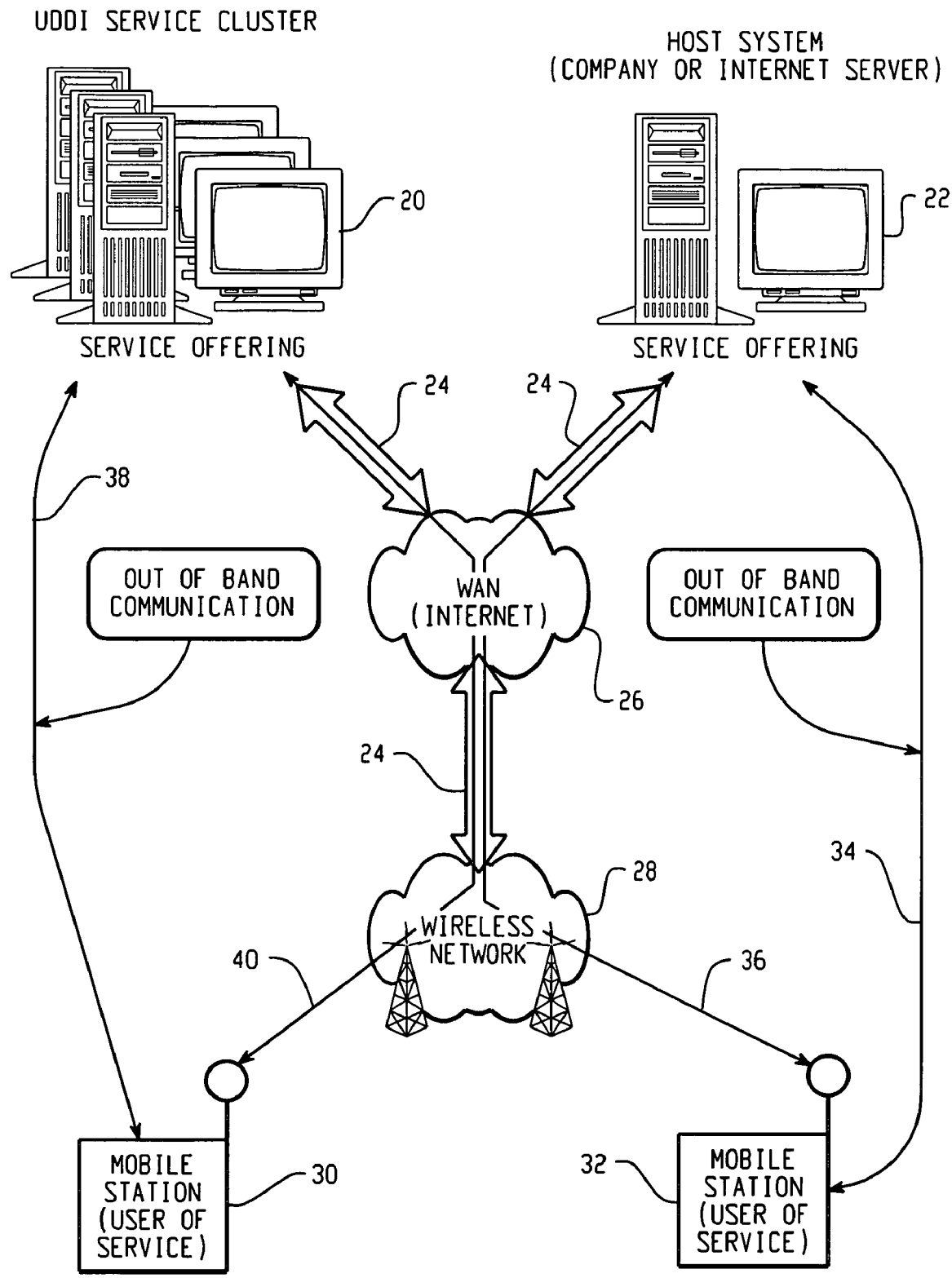
FIG. 1 shows a block diagram of a first exemplary communication system, between a fixed and a wireless system.

Referring to FIG. 1, there is shown a block diagram of a first exemplary communication system, between a fixed and a wireless system. This overview diagram shows a network environment where the invention is used. The diagram shows an exemplary embodiment of the invention and focuses on a network topology that includes a mobile device that is wireless. In this Figure there are systems offering services 20 and 22, and systems using the services 30 and 32. Between the service offering (also referred to herein as a service provider) and the service user are one or more networks and one or more connections to enable the flow of data between the two systems.

Turning now to FIG. 1 the service offering 20 or 22 can be many possible computers offering services to users. For one skilled in the art some well known service providers could be computers on the Internet within an Internet Service Provider (ISP) or Application Service Provider (ASP) office. The service offering 20 and 22 can also be one or more computers running within a private or public company, like a bank, stock broker, insurance broker or some other service-oriented company. The service offering 20 or 22 may also be run as part of a cluster of computers operating world-wide, making up a Universal Description, Discovery and Integration Cluster (UDDI cluster). The common element in all these service offerings 20 and 22 is that these service offerings 20 and 22 need to establish a secure data channel with a user. In the case of UDDI the secure relationship might be needed to exchange private service listings, or even to allow UDDI to proxy a service offering.

The mobile devices and the service hosts may be addressed in a variety of different ways. In some embodiments, they may be addressed with IP (internet protocol) addresses. In other embodiments, the host system may be addressed by an e-mail address. In yet another embodiment, the destination address may be an e-mail address of a user of the mobile device within the host system.

One skilled in the art will appreciate that the user of the service 30 and 32 might be a mobile hyper-text transfer protocol (HTTP) browser, a mobile wireless application protocol (WAP) browser, a proprietary transmission control protocol/internet protocol (TCP/IP) based application or some proprietary corporate solution. In this field there are new methods being developed quickly, including for example the new Java 2 Micro Edition (J2ME) solution for small wireless mobile devices, like cell phones and personal digital assistants (PDAs). For devices that use J2ME the option of attaching and downloading software through a service offering is becoming commonplace. Similarly the service offering 20 and 22 can be based on an HTTP web server solution, a Java Enterprise solution, a wireless markup language (WML) based service offering or some proprietary service solution created for a specific purpose.

It will be appreciated that mobile systems and host systems referred to herein can each comprise one or more respective memories (e.g., containing processing instructions) and one or more respective processing units, such as those conventionally known, e.g., general purpose processing units and/or special purpose processing units such as application specific integrated circuits (ASICs) and field programmable gate arrays (FPGAs), wherein the processing units can be configured (e.g., programmed with suitable software and/or firmware instructions, and/or produced with specialized hardware circuits) to carry out the approaches described herein. Each of such systems can also include any suitable interface(s), such as those conventionally known, which can operate in conjunction with a respective processing unit(s) to facilitate communication with other systems.

The end-points in the communication path are coupled through one or more data networks that allow the exchange of data, voice, video, music, photographs or any other digital media that can be exchanged through a data communications channel. The two main networks included in this illustration are a Wide Area Network (WAN) 26, the most common one being the Internet, and a wireless network 28. The wireless network 28 could be a GSM/GPRS network, a CDMA/1XRTT network, a CDMA2000 network, a $3^{rd}$ Generation network like EDGE or UMTS or many other public wireless networks soon to be available. In an exemplary system these networks are coupled using links 24 like ISDN, T1, Ethernet (land-line and 802.11), Frame Relay, ATM, ADSL or some other high speed Internet connection to the host service 10b. As greater amounts of data are being exchanged it is clear that security needs to be improved and made more foolproof to hackers and eavesdroppers. The invention works with these existing data communication paths to provide advanced password-based authentication. This level of security provides greater confidence that the recipient of any communicated data is exactly the entity you expect. One embodiment for a data communication path 36 is illustrated between a Host System service offering 22 and a user of the service on a mobile device 32. Another embodiment for a data communication path 40 is illustrated between a UDDI service offering 20 and a user of the service on a mobile device 30.

In one embodiment the host system service offering 22 has an out-of-band communication 34 (i.e., a communication over any suitable secure channel) with a user of a mobile device 32. The out-of-band communication path 34 is used for exchanging a shared secret, avoiding the insecure path that is desired to be made secure. Since the UDDI service cloud provides some level of security, a UDDI service cloud might be used to locate the service and receive the out-of-band shared secret with the final destination service. The following are a few examples of out-of-band communication paths 34 and 38:

(a) The mobile device user 30 or 32 and an operator at the host system 20 or 22, establish a phone call with each other to exchange the shared secret. The secret is then entered into each system and used in the process of creating an encryption key.

(b) The mobile device user 30 or 32 connects to a secure web site 20 or 22, either wirelessly or over a wired network and requests a key. The key is received and manually entered into the mobile device 30 or 32. The host system 20 or 22 could receive the key automatically from the web server, or it could also be manually entered. In some embodiments, a record is automatically generated after a shared secret was requested.

(c) The user of the mobile device 30 or 32 makes the request for the service and the shared secret is e-mailed by the host system 20 or 22 to their corporate mailbox that is known to be in a secure area. The user retrieves the shared secret from their electronic mailbox and manually enters it into the mobile device 30 or 32.

(d) The user of the mobile device 30 or 32 makes the request for the service and an operator at the service 20 or 22 generates a shared secret and it is given to a specified person who is known to be trusted and secure. This person could be a secretary or administrator of a given group; ideally it is someone that can confirm the identity of the user making the request. This trusted person then gives the shared secret to the final user of the mobile device 30 or 32 and it is manually entered into the mobile device 30 or 32.

This short list shows that there are many ways to authentically give a shared secret to a mobile device 20b user. The common property of these exemplary out-of-band communications 34 and 38 is that some level of authentication should be built in or assumed in the choice made. This authenticated communication path should preferably be different than the non-authenticated data communication path.

Once the shared secret is exchanged the next step in creating a secure communication path can take place 36 and 40. One of the better-known methods for creating a secure and authenticated link is using a strong password-based encryption method like SPEKE. SPEKE is a cryptographic method for knowledge-based authentication that leverages and protects easy-to-remember passwords—i.e. shared secrets. SPEKE is the simplest of the known strong password methods. It is a password-authenticated Diffie-Hellman exchange, where the password forms the base or "generator" of the exchange. (In standard Diffie-Hellman, the base is usually a fixed public number.) Once the communication path through the WAN 26 and wireless network 28 has been made secure, the re-key sequence can be initiated. The re-key sequence allows for the generation of a new set of keys after a predetermined number of weeks or months. During this re-key sequence the advanced use of long-term encryption keys allows for the implementation of perfect forward secrecy. Once the authentication secret (shared secret) is used to create a secure path, it can be reused to create new keys at later dates. By using this invention the re-keying operation does not compromise previous keys and all previous conversations remain secret into the future.

Figure 2:
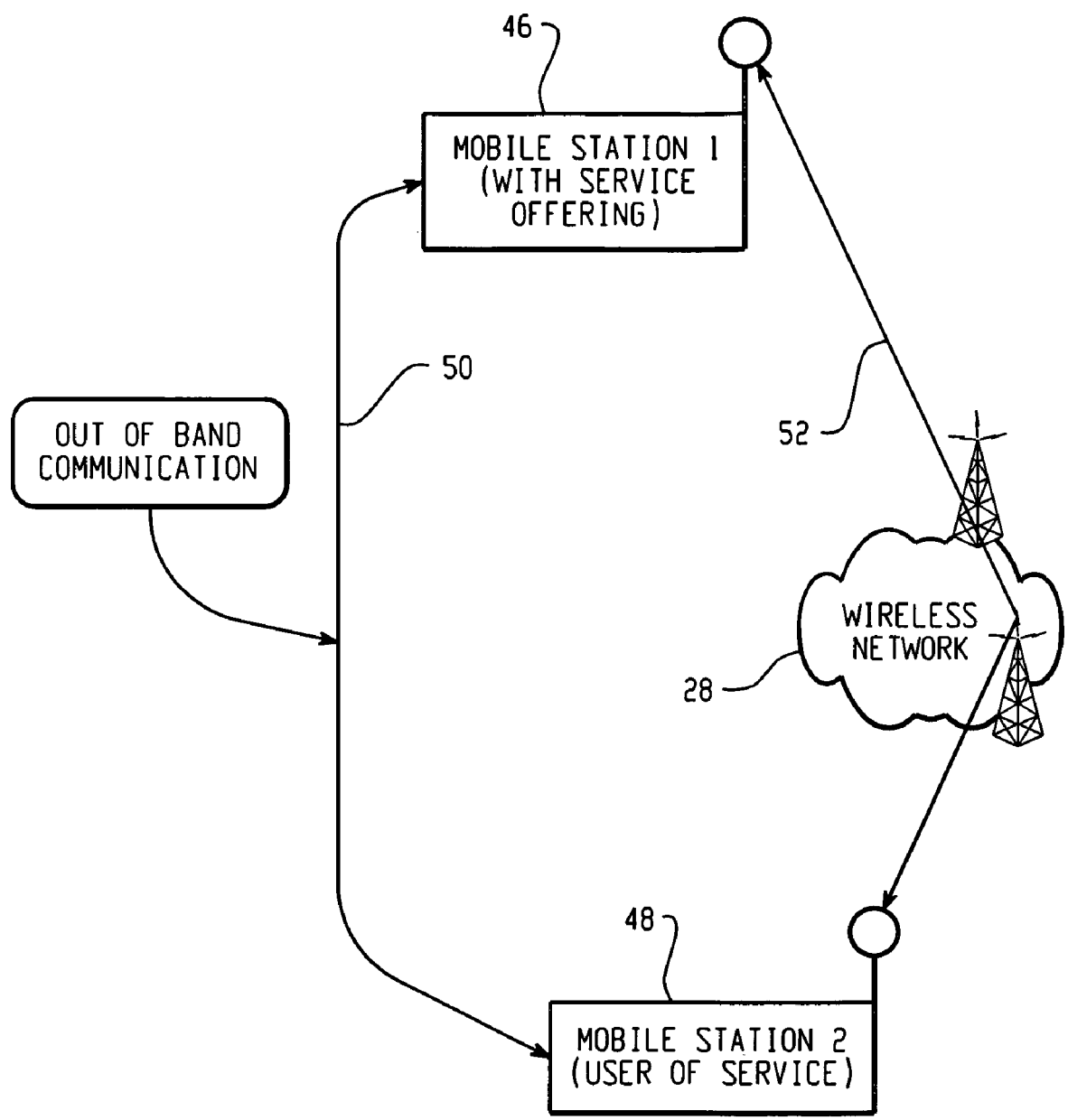
FIG. 2 shows a block diagram of a second exemplary communication system, between two wireless systems.

Turning to FIG. 2 there is shown a block diagram of an exemplary communication system, between two wireless systems, according to an embodiment of the present invention. In this embodiment, a secure path can be created between two mobile devices. In this embodiment mobile device 1 46 and mobile device 2 48 exchange a secret and are able to establish a common key using that shared secret. The out-of-band conversation 50 could take place via a phone call between the two parties, or a face-to-face meeting, or using one of the other methods already outlined or any other suitable method. Once the secret is shared, it can be manually typed into the mobile devices 46 and 48, and one station can initiate the exchange of messages to create a common master security key. This type of embodiment might be commonly used for private point-to-point e-mail conversations. It could also be used for point-to-point secure instant messaging data exchanges. In advanced usage mobile device 1 46, who is providing the service, might be running a web server on the mobile device 46 and offering some form of secure service offering that is also mobile.

Figure 3:
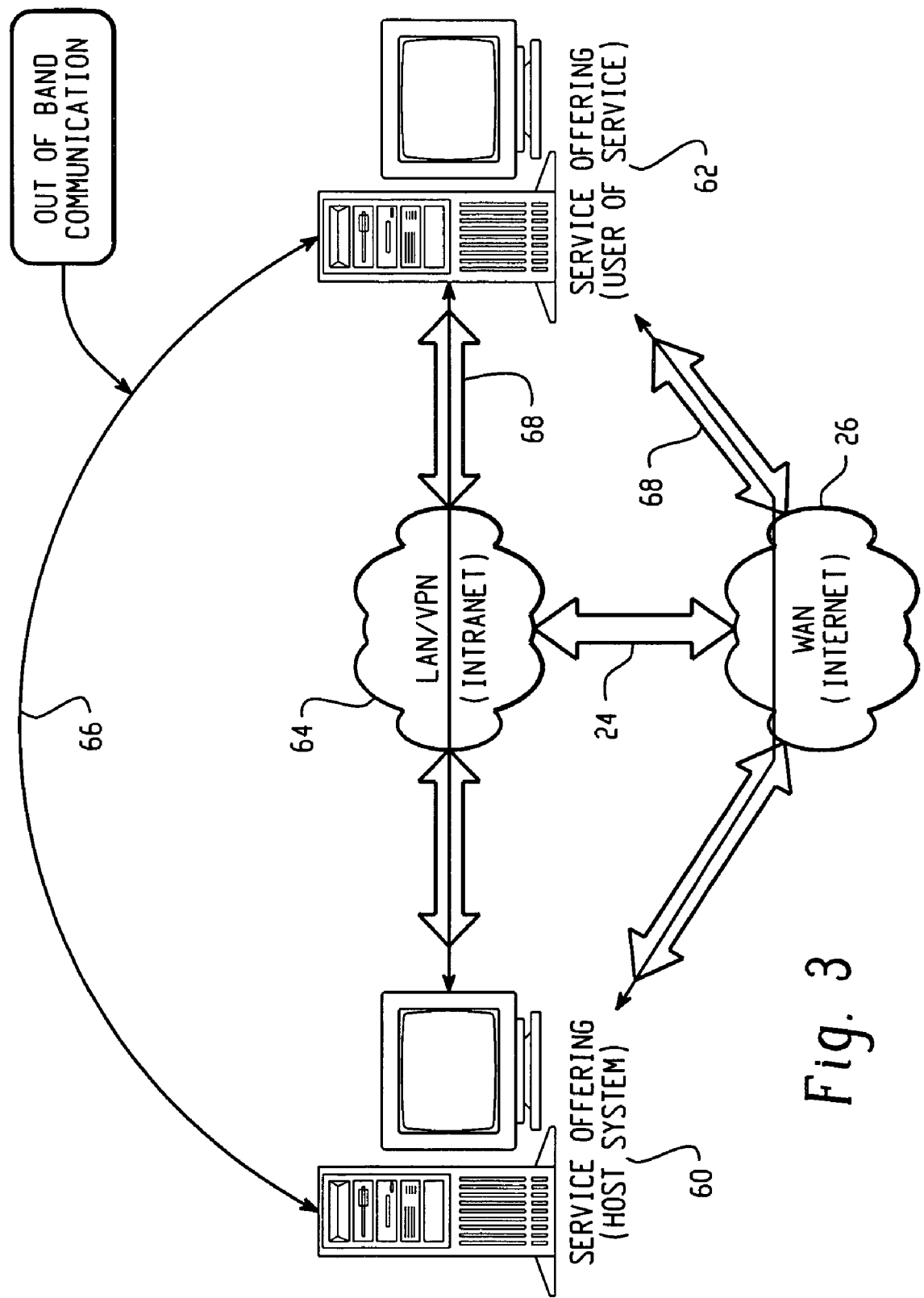
FIG. 3 shows a block diagram of a third exemplary communication system, between two fixed systems.

Turning to FIG. 3 there is shown a block diagram of an exemplary communication system, between two fixed systems, according to an embodiment of the present invention. In this embodiment the communication takes place between two Host Systems 60 and 62. In this illustration the service offering 60 and the service consumer 62 have an out-of-band conversation 66 and exchange a secret key. As described already this out-of-band communication could be a phone call, a communication via a browser with a secure SSL connection to generate and retrieve the key, or some other suitable communication such as provided earlier. Once the secret is exchanged an encryption key can be generated using strong password-based key generation methods like SPEKE. The communication path to exchange the key in this illustration could be over a WAN network like the Internet 26, or through an internal Intranet 64, or other suitable communication path such as or similar to an 802.11 or Bluetooth link. In these latter examples the service consumer 62 might be running a laptop or palmtop and already have a limited access to the Intranet, but greater security is desired or required. It is well known in the art that 802.11b lacks the robust security requirements requested by most large computer departments inside companies. This embodiment illustrates that the invention can be used to provide the option of perfect forward secrecy when using a password-based authentication mechanism. Once suitable messages are exchanged to create the master key, the data communication path 68 can be used to exchange all forms of data secretly with high security.

Figure 4:
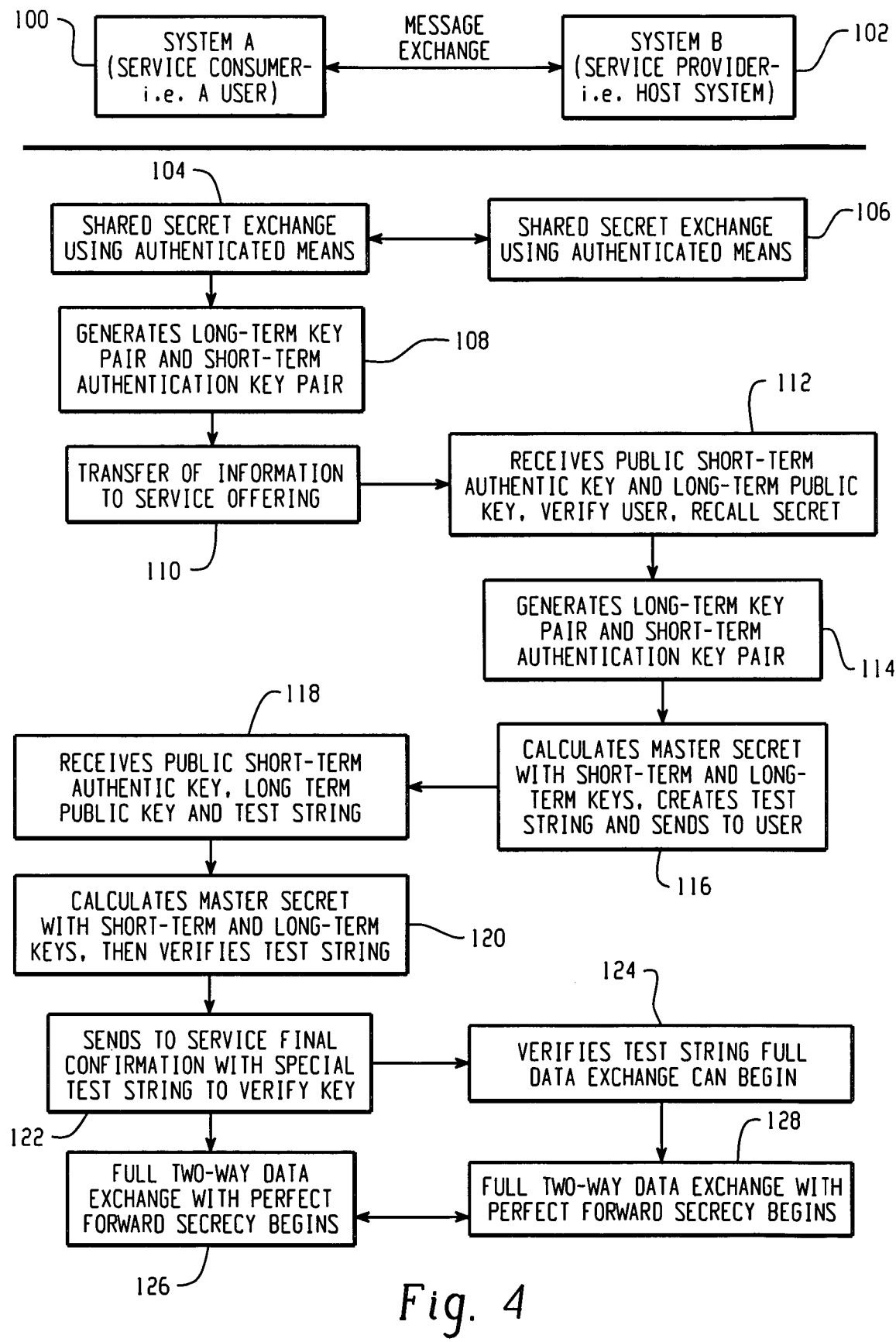
FIG. 4 shows a message exchange diagram of an exemplary set of data exchanges for implementing the communication system of FIG. 1 where a user is the initiator of the data exchange.

Turning to FIG. 4 there is shown a message exchange diagram showing an exemplary set of data exchanges for generating and verifying a master key, where the user is the initiator of the data exchange. This illustration shows exemplary steps and message exchanges between a service consumer 100 (user) and a service provider 102. In this illustration one end of the connection is considered a service consumer or user 100, and has been given the label system A. The other end of the connection is considered the service provider (also referred to as a service offering) or host system 102, and has been given the label system B. In this example the user 100 initiates the exchange of data to create a secure connection. Between System A and System B is a message exchange over one or more data communication networks such as illustrated in FIG. 1. Similarly as shown in FIGS. 1, 2 and 3, the user could be a mobile device 30, 32 or 48, or a Host System 62. Likewise the service provider could be a mobile device 46 or a Host System 20, 22 or 60.

As shown at step 104, the user 100 contacts a known service provider 102 through one of the methods already described for out-of-band communication or through another suitable method to exchange a shared secret. This service provider 102 wants to facilitate this exchange and issues a secret password or simple, easy to remember password strings (step 106). Through this mechanism a shared secret is generated and exchanged between the two parties. The user 100 receives and saves the secret to assist in encryption key generation. Alternatively, the service provider 102 can receive a secret password (shared secret) from the user 100. In either case, the service provider saves the shared secret in relation to this user.

After exchange of the shared secret, the user 100 then initiates (in this example) steps of generating key pairs (step 108) and transferring key information to the service provider (step 110). In particular, the user 100 generates a long-term encryption key pair at step 108, i.e., the public and private parts of an encryption key. A short-term authentication key pair is also generated at step 108 by the user 100. This short-term key pair is referred to as an authentication key pair in this example because it is generated using the shared secret as discussed further below.

Once the user's short-term and long-term key pairs are generated, the public keys thereof are transmitted at step 110 to the service provider 102 to further generate the final master key (also referred to as a master secret). This transfer can take place over an insecure link, as only the host system 102 that issued the shared secret can understand and use the short-term authentication key to generate the master key. Once the user's public keys are received by the service provider (step 112), the user is verified, and the shared secret for that user is recalled 112. Once the user is verified and the shared secret for the user is recalled, the service provider 102 proceeds to generate its own short-term authentication key pair using the shared secret (step 114). The service provider 102 also generates its own long-term encryption key pair (step 114). Using the public keys generated by the user 100 and using the shared secret, the service provider 102 generates a master encryption key (or master secret) as shown at step 116. The shared secret provides the authentication necessary to trust the information exchanged. The service provider's short-term public authentication key, the service provider's long-term public encryption key, and a key confirmation value that has been calculated by the service provider using the newly generated master encryption key, and some known string, are sent to the user (step 116).

The user receives the information (step 118) sent from the service provider 102 including the service provider's short-term and long-term public keys and generates the user's own master key (step 120). With this master key the user verifies the key confirmation value (step 120). In this example, the key confirmation value could be the hash of the master key and the name of the service or some other known string, agreed upon by the user and the service provider. If the key confirmation value does not verify, the master key created by the user 100 is not trusted, and it is assumed that someone is trying to compromise the connection. If the master encryption key generated by the user 100 seems valid the user then sends a final key confirmation value back to the service provider (step 122). The service provider receives the message, verifies the key confirmation value and marks the user as ready to go (step 124). This allows full data exchange to take place from the service provider's point of view (step 128). On the user side, once the verification message is sent there would be a slight pause in transmission but then full data exchange can begin (step 126).

Transmissions may comprise e-mail messages, HTTP (hyptertext transfer protocol)-based traffic, such as XML (extensible markup language), WML (wireless markup language), etc., or other types of traffic.

In some embodiments, the host system is capable of sending a data payload in a message sent to the mobile device before the final confirmation value is sent to it from the mobile device. The payload in this message may be a service book entry that defines the host service at the host system. In some embodiments the service book entry may be a UDDI service entry that defines attributes of a host service at the host system being accessed.

It will be appreciated that the long-term encryption key pair generated by a first party (e.g., a user) as described herein is an example of, more generally, a first key pair, wherein the public key portion and the private key portion thereof can be referred to as a first public key and a first private key. Similarly, the short-term authentication key pair (also referred to as a short-term encryption key pair) generated by the first party (e.g., the user) as described herein is an example of, more generally, a second key pair, wherein the public key portion and the private key portion thereof can be referred to as a second public key and a second private key. Also, the long-term encryption key pair generated by a second party (e.g., a service provider) as described herein is an example of, more generally, a third key pair, wherein the public key portion and the private key portion thereof can be referred to as a third public key and a third private key. Similarly, the short-term authentication (or encryption) key pair generated by the second party (e.g., the service provider) as described herein is an example of, more generally, a fourth key pair, wherein the public key portion and the private key portion thereof can be referred to as a fourth public key and a fourth private key. The first party that generates the first and second key pairs could be a user, such as described in the example above, or a service provider, such as described in the example below.

Figure 5:
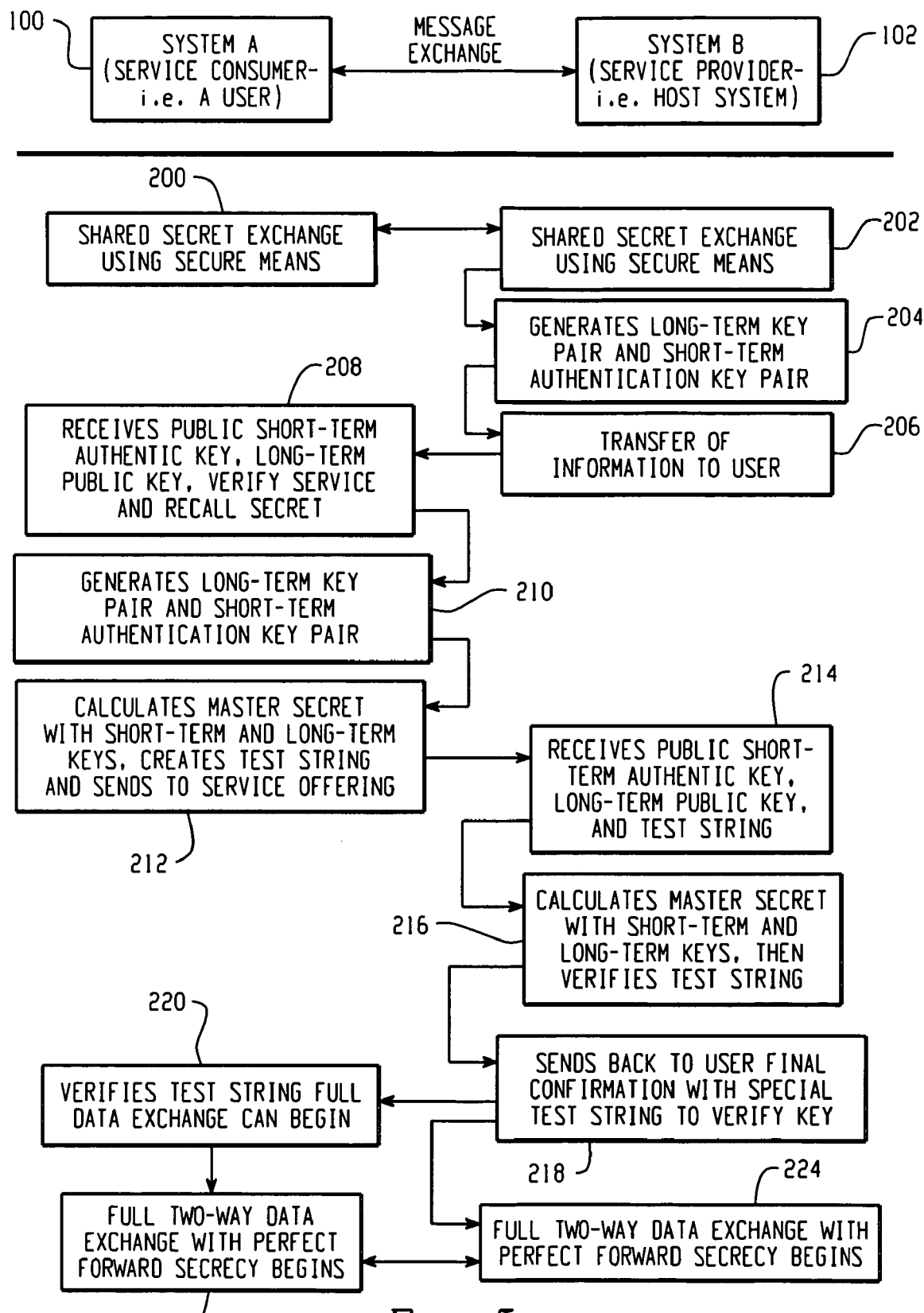
FIG. 5 shows a message exchange diagram of an exemplary set of data exchanges for implementing the communication system of FIG. 1 where a service provider is the initiator of the data exchange.

Turning to FIG. 5 there is shown a message exchange diagram showing an exemplary set of data exchanges for generating and verifying a master key, where the service provider is the initiator of the data exchange. The steps within FIG. 5 substantially correspond to the steps within FIG. 4, except the service provider takes the first step. This example highlights that either the user or the service provider can be the initiator of the data exchange. In this illustration one end of the connection is considered the user 100, and is labeled system A—service consumer. The other end of the connection is considered the service 102, and is labeled system B—Service Provider. Between System A 100 and System B 102 is a message exchange over one or more data communication networks 26, 28 and 64 such as illustrated in FIGS. 1, 2 and 3. Similarly as shown in FIGS. 1, 2 and 3, the user could be a mobile device 30, 32 or 48, or a Host System 20, 22, 46 or 60.

As shown at steps 200/202, the service provider 102 contacts the user 100 (in this example) to exchange a shared secret. Alternatively, the user could initiate this communication. It is contemplated that an administrator within a host company 102 might contact the user 100 and inform the user that the user has to perform some action with the shared secret being provided. Using any suitable method selected from the extensive list of out-of-band communications already provided, or some other suitable method, the shared secret is generated and exchanged (steps 200 and 202). The User component receives and saves the shared secret to assist in encryption key generation. Alternatively, the service provider 102 can receive a secret password (shared secret) from the user 100. In either case, the service provider saves the shared secret in relation to this user.

After exchange of the shared secret, the service provider 102 can initiate (in this example) steps of generating key pairs (step 204) and transferring key information to the user 100 (step 206). In particular, the service provider 102 generates a short-term authentication key pair and a long-term encryption key pair (step 204). This corresponds to step 108 in FIG. 4.

Once the service provider's short-term and long-term key pairs are generated, the public keys thereof are transmitted to the user (step 206) to further generate the final master key (also referred to as a master secret). This transfer can take place over an insecure link as only the owner of the shared secret would be able to understand and use the short-term authentication key to generate the master key. The service provider's public keys are received by the user, and it checks memory to verify the service creation is expected and that it has a shared secret saved in memory (step 208). The user recalls the shared secret for that service provider 102 and generates a short-term authentication key pair using the shared secret (step 210). The user also generates a long-term encryption key pair (step 210). Using the public keys generated and sent by the service provider 102 and using the shared secret, the user 100 generates a master encryption key (or master secret) as shown at step 212. After generating the master key the user 100 also generates a key confirmation value by combining a known string (i.e., known to itself and the service offering) with the master key (step 212). The user's short-term public authentication key the long-term public encryption key, and the key confirmation value are sent to the service provider (step 212).

The service provider receives the user's public keys and key confirmation value and verifies the sender of the information (step 214), and also recalls the shared secret for this user. With the received public key values of the user, the service provider recalls its own saved private key values for this user (step 214). Using the received public keys of the user and the service provider's saved private keys, the service provider can now generate a master key (step 216). After generating the master key, the service provider 102 verifies the key confirmation value by calculating its own key confirmation value, using the known string and the newly created master key, and comparing it against the received key confirmation value (step 216). If the key confirmation value does not verify, the created master key is not trusted, and it is assumed that someone is trying to compromise the connection. If the key confirmation value does verify, the master encryption key is considered valid and the service provider 102 sends a final key confirmation value back to the user (step 218). The user receives the message (step 220), verifies the key confirmation value, and marks the service provider as ready to go (step 220). This allows full data exchange to take place from the user's point of view (step 222). On the service offering side, once the verification message is sent there would be a pause in transmission, but then full data exchange can begin (step 224). In most cases it will be the user that initiates the first data exchange; so having the confirmation sent to the user does have some advantages.

Transmissions may comprise e-mail messages, HTTP (hypertext transfer protocol)-based traffic, such as XML (extensible markup language), WML (wireless markup language), etc., or other types of traffic.

Figure 6:
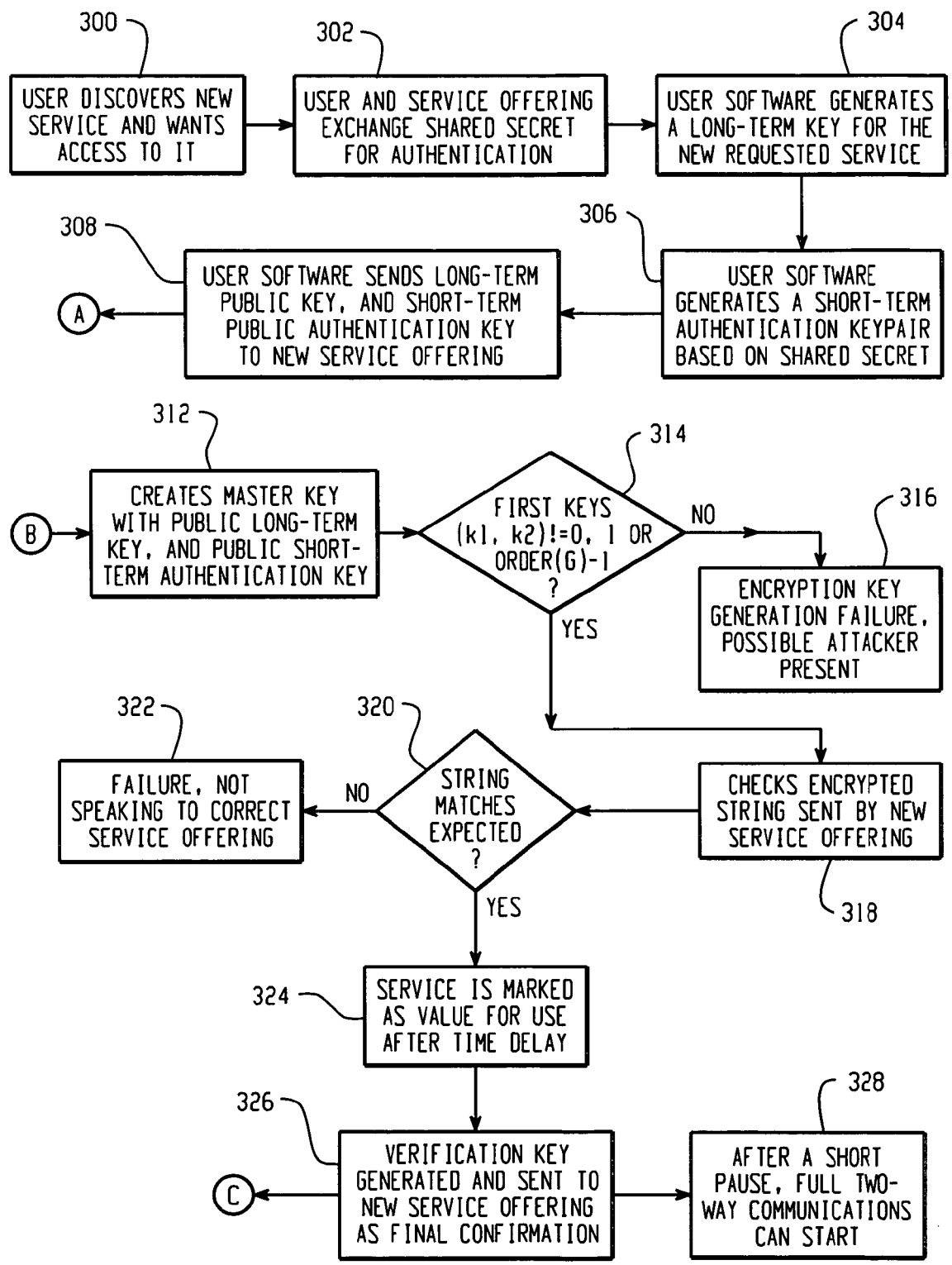
FIG. 6 shows a data flow diagram of the steps within the user software for carrying out the steps in FIG. 4 where the user is the initiator of the key exchange.

FIG. 6 is a data flow diagram of exemplary steps carried out by the user (e.g., within the user software) for carrying out the exemplary approach shown in FIG. 4, when the user is the initiator of the key exchange. The first step occurs when the user discovers a new service and wants to access it (step 300). This might occur via a UDDI-like service, through a corporate Intranet service, through browsing the world-wide web, through conversation with a friend or through a phone call. Once the service and user have connected, they exchange a shared secret 's' that only the two of them know (step 302). Exemplary methods for this exchange have been described in detail already. This shared secret 's' will be used later like a PIN (Personal Identification Number) to authenticate the user and the service to each other. When the user is ready to access the service, the user (e.g., in software) generates a long-term key pair for the requested service (step 304). This long-term key pair is one of the key values used during all for future re-keying operations. For all of the mathematical calculations in the remainder of this application, we assume that all parties involved in the transactions have agreed beforehand on a group G, of size order(G), and an element g of G such that q=order(g) is a large prime number. G and g may be publicly known, i.e., they do not need to be kept secret. Exemplary mathematical calculations to create key values are as follows (using a SPEKE method), and while the exemplary calculations shown below utilize a multiplicative group, it will be apparent that suitable calculations could be carried out using an additive group:

Pick A Long-Term Key Pair (e.g., by User)
Pick Random a, 1<a<q−1;
Calculate $A=g^a$;
If A=1, keep choosing different a's until A< >1.

The value 'A' is the user's long-term public key (or, more generally, first public key), and the value 'a' is the user's long-term private key (or, more generally, first private key).

In this example, the selected number 'a' is greater than 1 and less than the prime number q−1. Once the private key is selected (i.e. 'a') and the public key is generated (i.e. 'A'), the private key 'a' is stored securely, and the public key 'A' is eventually transmitted to the service provider.

A short-term authentication key pair is also generated by the user based on the shared secret 's' (step 306). Using a similar calculation following a SPEKE key generation method, exemplary mathematical calculations for this step are (using, e.g., the same assumptions for q and for 'a' (as now applied to x) as before):

Pick A Short-Term Authentication Key Pair (e.g., by User)
Pick Random x, 1<x<q−1;
Calculate $X=s^x$;
If X=1 keep choosing new x's until X< >1.

The value 'X' is the user's short-term public key (or, more generally, second public key), and the value 'x' is the user's short-term private key (or, more generally, second private key). The value 's' is the shared secret.

In this example, the selection of 'x' is between 1 and the prime number q−1. The user software then sends the public key values 'A' and 'X' to the service offering (service provider) as shown at step 308. This step proceeds to (A) where the service offering receives the values and performs additional calculations, shown in FIG. 7. Once the service offering has completed those calculations, it returns a similar pair of its own public key values 'B' and 'Y' with a key confirmation value to the user for verification (step 312) as discussed further below in connection with FIG. 7. This is shown as input (B) in FIG. 6 coming from FIG. 7. At this point the user is able to use 'B' and 'Y' to create a master key using, e.g., advanced SPEKE calculations. By using both 'B' and 'Y' together to generate the master key, the encryption method allows for the implementation of perfect forward secrecy. This is seen more clearly in the re-key sequence shown later. An exemplary master key calculation is as follows:

Calculate Master Key (e.g., by User)
$k1=Y^x$;
$k2=B^a$;
check whether k1, k2!=0, 1, or order(G)−1;
k=hash(k1 ∥ k2) where ∥ is a concatentation function.

Here, 'x' is the user's short-term private authentication key (or, more generally, second private key), and 'Y' is the received short-term public authentication key of the service offering (or more generally, fourth public key). Also, 'a' is the user's long-term private encryption key (or, more generally, first private key), and 'B' is the received long-term public encryption key of the service offering (or, more generally, third public key).

The value 'k' represents the master key that can be used for encrypting data between the user and the service. The value 'k' is a combination of the intermediate keys 'k1' (based on the short-term authentication keys) and 'k2' (based on the long-term encryption keys). A check can be made on the intermediate key values of k1 and k2 at step 314 to verify that these two values are not 0, 1 or order(G)−1; otherwise it could mean there is a security attack being attempted This attack would result if the key were being forced into a small subset of total possible keys. If the attacker sends an X=0 or Y=0, the communicating parties could get a resulting key value of 0. This quick check will ensure that an attack is not being staged. If however the value of k1 or k2 does fall into one of these small subset groups, the negotiation for a key can be aborted (step 316).

If a subset attack is not detected, the master key 'k' can be used by the user to test the key confirmation value sent by the service offering (step 318). One method for generating a key confirmation value is to hash the key with a known string such as the bytes in the public key "A". An exemplary calculation to test key confirmation value would be:

Test Key Confirmation Value

"Received $h_A$"=$h_A$=hash (k ∥ bytes of public key"A") where "received $h_A$" came from the service offering, and 'k' is the local master key.

If the software's generated key confirmation value for 'A' does not match (step 320) the received key confirmation value, then it is incorrect (step 322). An incorrect key confirmation value could mean that a man-in-the-middle attack, or some other attack is being attempted. The operation will be aborted in this case (step 322). If the two confirmation values match, then it is assumed that a fully secure link has been established (step 324). The link is marked as valid and after a short delay will be used for communications (step 324). Using the newly generated verification key, the user sends this value back to the service (step 326). This follows back to FIG. 6 following label (C). After a few moments pause, i.e., to ensure the confirmation is received by the service offering, the user can begin to exchange data (step 328).

Any suitable encryption and decryption methods can be used to encrypt and decrypt messages using the master key, such as symmetric-key encryption/decryption methods like the Advanced Encryption Standard (AES) (Federal Information Processing Standards Publication 197, Nov. 26, 2001, National Institute of Standards and Technology).

Figure 7:
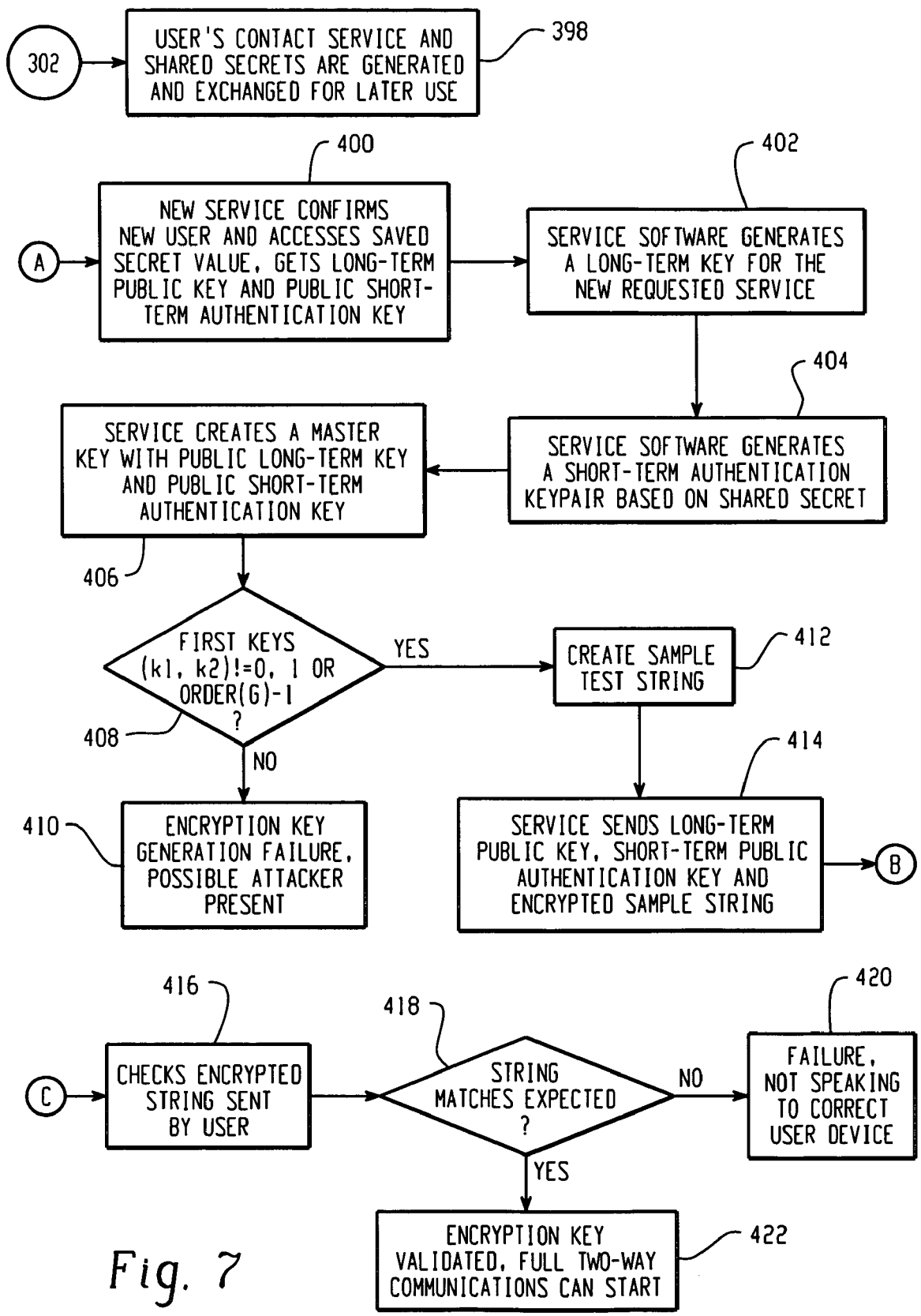
FIG. 7 shows a data flow diagram of the steps within the service software for carrying out the steps in FIG. 4 where the user is the initiator of the key exchange.

FIG. 7 is a data flow diagram of exemplary steps carried out by the service offering (e.g., within the service provider software) for carrying out the exemplary approach shown in FIG. 4 when the user is the initiator of the key exchange as shown in FIG. 4. The process starts when a user contacts a service provider 'out-of-band' to exchange a shared secret (step 398). This corresponds with step 302 in FIG. 6 on the user's device. This out-of-band exchange has been discussed several times and also provides a level of authentication that the user and service are who they say they are. Once this exchange is complete, the user is free at any point in time to contact the service to begin the process. Once the user does contact the host service, shown with message (A) arriving from the user's flow chart in FIG. 6, the new user is verified (step 400). Since a service provider might have tens or hundreds of users wanting to start using their service at any time, the service provider is passive until the user decides he wants to start the service. Even though a shared secret has been exchanged this may mean very little, and stale shared secrets might even be purged after some number of days if the user fails to connect over that time period. The arrival of the message allows the service provider to find the new user and verify that a shared secret exists (step 400). In the message is the user's public short-term authentication key, which is based on the shared secret (step 400). The message also contains the user's public long-term encryption key (step 400), which can be used in the implementation to create perfect forward secrecy when re-key operations take place, FIGS. 7 and 8.

The service offering generates a long-term encryption key pair for this user, in a manner similar to the long-term encryption key-pair created by the user (step 402). Exemplary mathematical calculations to create the service offering's long-term encryption key pair are as follows (e.g., using a SPEKE method):

Pick A Long-Term Key Pair (e.g., by Service Provider)
Pick Random b, 1<b<q−1;
Calculate B=$g^b$
If B=1, keep choosing different b's until B< >1.

The value 'B' is the service offering's (service provider's) long-term public key (or more generally, third public key), and the value 'b' is the service offering's long-term private key (or, more generally, third private key).

In this example, the selected number 'b' is greater than 1 and less than the prime number q−1. Once the private key 'b' is selected and the public key 'B' is generated, the private key 'b' is stored securely, and the public key 'B' is eventually transmitted back to the user so he can use it in his calculations.

The service offering also generates a short-term authentication key pair based on the shared secret (step 404). Using a similar calculation following a SPEKE key generation method, exemplary mathematics for this step are (using, e.g., the same assumptions for q and for x (as now applied to y) as before):

Pick A Short-Term Authentication Key Pair (e.g., by Service Provider)
Pick Random y, 1<y<q−1;
Calculate Y=$s^y$;
If Y=1, keep choosing y's until Y< >1.

The value 'Y' is the service offering's (service provider's) public short-term authentication key (or, more generally, fourth public key), and the value 'y' is the service offering's private short-term authentication key (or, more generally, fourth private key).

In this example, the selection of 'y' is between 1 and the prime number q−1. The public key values 'B' and 'Y' will eventually be sent to the user to generate the user's own master key.

The service offering then uses the public keys 'A' and 'X' received from the user, and the private keys just calculated to generate a master key (step 406). By using both 'A' and 'X' together to generate the master key the encryption method provides perfect forward secrecy. To provide perfect forward secrecy, if desired, the implementation can also use the private keys in the re-generation of subsequent keys during any re-key sequence. An exemplary master key calculation is as follows:

Calculate Master Key (e.g., by Service Provider)
k1=$X^y$;
k2=$A^b$;
check that k1, k2!=0, 1, or order(G)−1;
k=hash(k1 ∥ k2).

Here, 'y' is the service offering's short-term private encryption key (or, more generally, fourth private key), and 'X' is the received short-term public encryption key of the user (or, more generally, second public key). Also, 'b' is the service offering's long-term private key (or, more generally, third private key), and 'A' is the received long-term public encryption key of the user (or, more generally, first public key).

The value 'k' represents the master key generated by the service offering, and it is the same as the master key generated by the user. This master key can be used for encrypting data between the service and the user. The value 'k' is a combination of the intermediate keys 'k1' (based on the short-term authentication keys) and 'k2' (based on the long-term encryption keys). A check can be made on the intermediate key values of k1 and k2 at step 408 to verify that these two values are not 0, 1 or order(G)−1; otherwise it could mean there is a security attack being attempted. This attack would result if the key were being forced into a small subset of total possible keys. If the attacker sends an X=0 or Y=0 the communicating parties could get a resulting key value of 0. This quick check will ensure that an attack is not being staged. If however the value of k1 or k2 does fall into one of these small subset groups the negotiation for a key can be aborted (step 410).

If a subset attack is not detected, the master key 'k' can be used by the service offering to test the key confirmation value sent by the user (step 416). One method for generating a key confirmation value is to hash the key with a known string such as the bytes in the public key "B". An exemplary calculation to test the string (key confirmation value) would be:

Test Key Confirmation Value
$h_B$=hash (k ∥ bytes of public key "B").

The service offering would then transmit the test string to the user so that it can verify that the master key generated by the user matches the master key created by the service offering. The service offering then sends the long-term public encryption key 'B', the short-term public authentication key 'Y' (or, fourth public key) and the verification string $h_B$ to the user (step 414).

Once the user has generated its own master key 'k' it sends back a final key confirmation value to ensure the service offering knows that everything has worked correctly (C). This final step (C) is shown in FIG. 7 as an input to the service offering at step 416. If the key confirmation value was calculated based upon 'A' and sent to the service offering (step 416), then this is what the test looks for (step 418). If the key confirmation value does not match the expected value the operation is aborted (step 420). If the key confirmation value is matched then it is assumed that a full two-way encrypted and secure data communication path exists (step 422).

The Re-Key Data Flow Sequence

Figure 8:
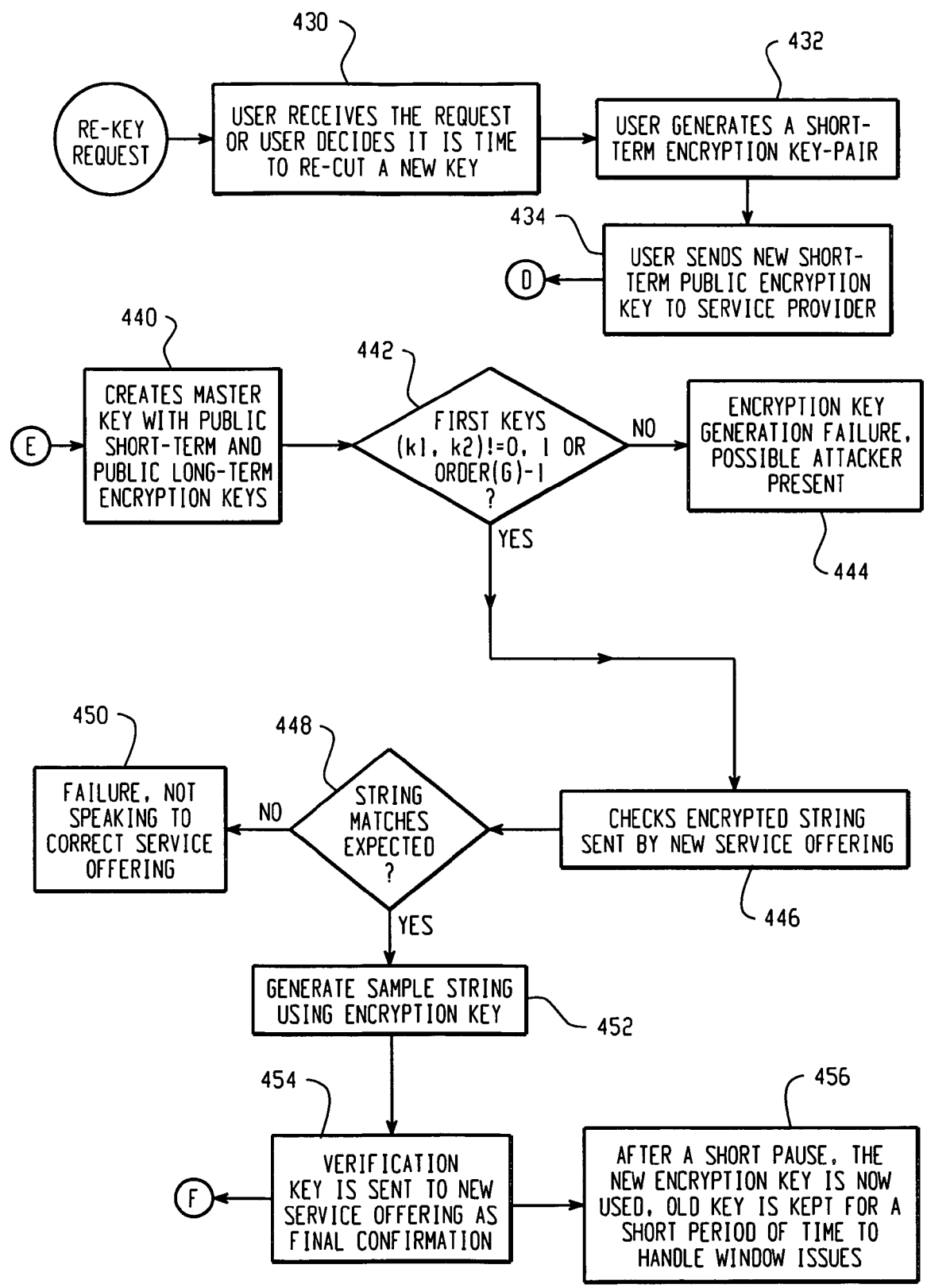
FIG. 8 shows a data flow diagram of the steps within the service user for a re-key sequence when regenerating another key in the environment illustrated in FIGS. 1, 2 and 3.

FIG. 8 is a data flow diagram showing exemplary steps within the user (e.g., within software) for a re-key sequence when regenerating another key in the environment illustrated in FIGS. 1, 2 and 3. This procedure illustrates the utility of using the long-term encryption key to enable the implementation of perfect forward secrecy. The process starts when either the user or the service offering decide a new key is desired or required. For this example we will assume the host (service provider) is running an encryption key expiry timer. However, there are many other ways the encryption key might be re-generated. The user might decide that it is time for a new key, the user or service might have fears that someone has been trying to attack and determine the current key value. Whatever the case, a new key is desired or required, and a unique method, not based on the original shared secret, can be used to generate the new key.

As shown in the example of FIG. 8 a re-key request is received by the user, or the user decides to cut a new key (step 430). Of course, step 430 could be executed by the service provider instead of the user. The user software generates a new short-term encryption key (step 432). An exemplary mathematical calculation is based on SPEKE and uses the same sequence as shown before:

Pick A New Short-Term Encryption Key Pair (e.g., by User)
Pick Random x, 1<x<q−1;
Calculate X=$g^x$;
If X=1, keep choosing x's until X< >1.

Here, 'x' is a "new" value generated for the user's short-term private encryption key. The value 'x' can be referred to either as an "encryption" key or as an "authentication" key (as was done previously) because the value 'x' contributes to both aspects. In this example, the selection of 'x' is between 1 and the prime number q−1. The user software then sends the newly generated public key value 'X' to the service provider 434. This step proceeds to (D) where the service provider receives the value and performs additional calculations. Step (D) is taken into FIG. 9 as input on the service provider side of the connection.

Once the service provider has completed those calculations with (D) shown in FIG. 9, it returns a similar new public encryption key 'Y' (discussed further below) with a key confirmation value for verification by the user (E). This is shown as input (E) in FIG. 8. At this point the user is able to use the service provider's new 'Y' key with the service provider's older long-term public 'B' key to create a master key following advanced SPEKE calculations, for example. By using both the existing 'B' and the new 'Y' together to generate the key, the encryption method can provide implementation of perfect forward secrecy. Perfect forward secrecy can be achieved because neither the existing 'B' nor the new 'Y' are based on the original shared secret, and the existing 'B' is combined with the new 'Y' to create a new key not directly based on the previous key. Additionally, the existing 'B' key carries some of the authentication generated with the original shared secret. Only an authenticated service user, that originally possessed the shared secret, would have been able to have the private key 'b' saved to disk. This is seen more clearly in the exemplary re-key mathematical calculation to create a new master key 'k':

Calculate Master Key (e.g., by User)
$k1=Y^x$;
$k2=B^a$;
check that k1, k2!=0, 1, or order(G)−1;
k=hash(k1 ∥ k2).

Here, 'x' is the user's new short-term private encryption key, and 'Y' is the new received short-term public encryption key generated by the service provider. The value 'a' is the user's existing long-term private encryption key, and 'B' is the service provider's existing long-term public encryption key.

The value 'k' represents the new master key that can be used for encrypting data between the user and the service provider. The value 'k' is a combination of the intermediate keys 'k1' (based on the short-term encryption key) and 'k2' (based on the long-term encryption keys). A check can be made on the intermediate key values of k1 and k2 (step 442) to verify that these two values are not 0, 1 or order(G)−1; otherwise it could mean there is a security attack being attempted (step 442). If however the value of k1 or k2 does fall into one of these small subset groups the negotiation for a key can be aborted (step 444).

If a subset attack is not detected, the new master key 'k' can be used to test the key confirmation value sent by the service offering (service provider) as shown at step 446. One method for generating a key confirmation value is to hash the key with a known string like the bytes of the public key of "A". The approach for calculating a key confirmation value can be the same as previously described. If the calculated key confirmation value does not match what was received (step 448), the key is assumed to be in error (step 450). An incorrect key confirmation value would mean that a man-in-the-middle attack, or some other attack is being attempted. Otherwise the user generates a final key confirmation value using the master key 'k' (step 452). The key confirmation value is sent to the service provider (step 454) as a final confirmation; as shown at point (F) in FIG. 8. Then after a short pause the new encryption key is used within the user software (step 456). During a short period of time there is also a window where messages that were previously transmitted could arrive in. During this period of several minutes the old key is kept and tried if decryption errors occur (step 456).

Figure 9:
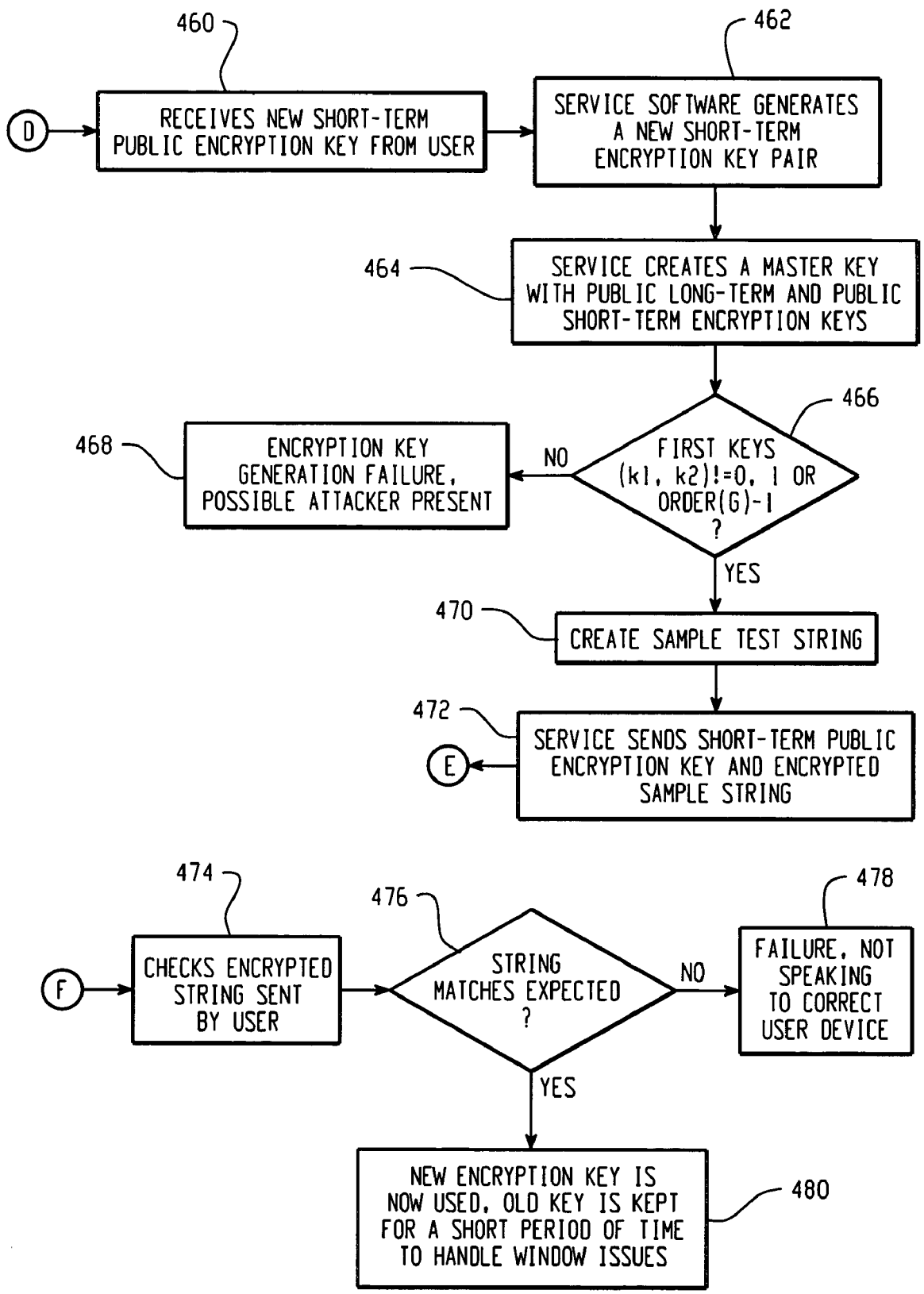
FIG. 9 shows a data flow diagram of the steps needed within the service provider for a re-key sequence when regenerating another key in the environment illustrated in FIGS. 1, 2 and 3.

Turning now to FIG. 9 this represents a data flow diagram of exemplary steps within the service provider for a re-key sequence when regenerating another key in the environment illustrated in FIGS. 1, 2 and 3. This procedure shows the utility of using the long-term encryption key in conjunction with the short-term encryption key for implementing perfect forward secrecy. In this embodiment we have assumed the user has started the process and has already created a new short-term encryption (or authentication) key pair as shown in FIG. 8. The arrival of the short-term public encryption key 'X' is shown as input (D). The public key is received and the user's configuration information is recalled and checked (step 460). The service offering then generates a new short-term encryption key pair for use over the next segment of time (step 462). Exemplary mathematics to create a new short-term encryption key is similar to what has been shown before, except the shared secret 's' is not used.

Pick A New Short-Term Encryption Key Pair (e.g., by Service Provider)
Pick Random y, 1<y<q−1;
Calculate $Y=g^y$;
If Y=1, keep choosing random y's until Y< >1.

In this example, the selection of 'y' is between 1 and the prime number q−1. The value 'Y' will eventually be sent to the user to generate a master key (step 472).

After picking a new short-term encryption key pair, a master key is generated by the service provider using the value 'X' that was just received from the user and the newly generated value 'y'. By using both 'A' and 'X' together to generate the key, the encryption method provides for perfect forward secrecy. An exemplary master key calculation is as follows:

Calculate Master Key (e.g., by Service Provider)
$k1=X^y$;
$k2=A^b$;
check that k1, k2!=0, 1, or order(G)−1;
k=hash (k1 ∥ k2).

Here, 'y' is the service provider's new short-term private encryption key, and 'X' is the new received short-term public encryption key generated by the user. The value 'b' is the service provider's existing long-term private encryption key, and 'A' is the user's existing long-term public encryption key.

The value 'k' represents the master key for the service offering (step 464). This will be used for encrypting all data between the service offering and the user. The value 'k' is a combination of the intermediate keys 'k1' (based on the new short-term encryption keys) and 'k2' (based on the long-term encryption keys). The calculation of 'k' is not directly dependent on the original shared secret 's', but the values 'A' and 'b' carry some of the authentication originally provided by 's'. A check can be made on the intermediate key values of k1 and k2 (step 466) to verify that these two values are not 0, 1 or order(G)−1; otherwise it could mean there is a security attack being attempted. If k1 or k2 do fall into one of these small subset groups the negotiation for a key can be aborted (step 468).

If a subset attack is not detected, the master key 'k' can be used to test the key confirmation value sent by the service offering (step 470). One method for generating a key confirmation value is to hash the key with a known string like the bytes in the public key "B" (step 470). This calculation can be similar to those already described. The service offering would then transmit its new short-term public encryption key 'Y' and the key confirmation value $h_B$ to the user (step 472). This transfer of the key values and the key confirmation value is shown at transfer box (E) in FIG. 9.

Once the user has generated its own master key 'k', it sends back a final key confirmation value to ensure the service offering knows that everything has worked correctly (step 454 of FIG. 8) as shown at (F). This final step at (F) is shown in FIG. 9 as an input to the service offering (step 474). If the key confirmation value was calculated for 'A' and sent to the service offering (step 474), then this is what the test looks for (step 476). If the key confirmation value does not match the expected value the operation is aborted (step 478). If the key confirmation value verifies, then it is assumed that a full two-way encrypted and secure data communication path exists (step 480). The server keeps the previous key for several minutes just in case packets were on route during this new key generation stage (step 480).

The above-described approach can be modified to utilize other exemplary calculations for generation (e.g., over-the-air) of secure keys. For example, a user (e.g., a mobile station such as mobile stations 30 or 32) and a service provider (e.g., a host system such as host systems 20 or 22) can first share a small secret key (e.g., cryptographically weak secret key), obtained through out-of-band methods such as those previously described, and then bootstrap to a larger cryptographically strong key. The bootstrapping is done in such a way that online and offline dictionary attacks are prevented.

For example, the exemplary protocols described below can allow the user (e.g., mobile station) and the service provider (e.g., host system) to negotiate cryptographic keys over the air, which is assumed to be an insecure channel. In this example, the first protocol is for the initial key exchange, and the second is for key regeneration (re-keying).

According to one example, the first protocol runs the SPEKE and Diffie-Hellman (DH) key exchange protocols in parallel. The resulting master key is a combination of the keys generated by the SPEKE and DH protocols. SPEKE combines a small shared secret with the DH key agreement protocol to negotiate a shared key, in such a way that precludes an offline dictionary attack. Specifically, SPEKE replaces the base point of the DH key agreement with the small shared secret.

The second protocol is the MQV technique (Menezes-Qu-Vanstone key agreement scheme) known in the art. An exemplary version of this technique is described in *Guide to Elliptic Curve Cryptography* by D. Hankerson, A. Menezes, and S. Vanstone (New York: Springer-Verlag, 2004); the MQV discussion of this reference is hereby incorporated herein by reference for the purpose of demonstrating the generally known state of the art of this technique.

In exemplary implementations, the user 100 (e.g., mobile station) and service provider (or host system) can share the following cryptosystem parameters:

$F_q$—a finite field of prime order q;

$E(F_q)$—an elliptic curve over $F_q$, such as the NIST (National Institute of Standards and Technology) approved 512 bit random elliptic curve over $F_q$, which curve has a cofactor of one (see Federal Information Processing Standards Publication, "Digital Signature Standard (DSS)", Jan. 27, 2000, Appendix 6, located at http://csrc.nist.gov/publications/fips/fips 186-2/fips186-2-change1.pdf);

P—any point of E that generates a subgroup of $E(F_q)$ of prime order r;

xR—represents elliptic curve scalar multiplication, where x is the scalar and R is a point on $E(F_q)$; and $$\bar{R} = \left(\bar{x} \bmod 2^{\lceil f/2 \rceil}\right) + 2^{\lceil f/2 \rceil}$$

where $\bar{x}$ is the integer representation of the x-coordinate of the elliptic curve point R, and f is the bit length of r (i.e., $f = \lfloor \log_2 r \rfloor + 1$).

The user 100 and host system 102 agree to use the above-noted parameters, or other suitable parameters, which can be either publicly known or private parameters. All mathematical operations can be done in the group $E(F_q)$, except that some MQV operations can be done in $Z_r$ (where $Z_r$ refers to integers modulo r).

Initial Key Exchange

As noted above, the first exemplary protocol utilizes SPEKE and DH together for initial key exchange. In describing the example below, reference will be made to the previously described flow chart of FIG. 4, which illustrates exemplary process steps where a user 100 (e.g., mobile station) is the initiator of data exchange. Of course, FIG. 5 is likewise applicable, which illustrates exemplary process steps where a service provider (e.g., host system) is the initiator of data exchange. Also, the exemplary steps need not occur in the order described.

To generate and exchange a shared secret (step 104), the user 100 and the host system 102 can use any suitable approach such as previously described above. Either party can generate the secret and share it with the other via an out-of-band communication.

The user 100 (e.g., mobile station 30 or 32) can generate a long term key pair (step 108) by picking a random number a where 1<a<r−1, and by calculating A=aP (elliptic curve scalar multiplication), where a is the user's long term private key (or first private key), A is the user's long term public key (or first public key), and P and r are as described above. Thus, in this example, the user's long term public key is generated using an elliptic curve calculation. The user 100 (e.g., mobile station) can then securely store a and A.

To generate its short term key pair (step 108), the user 100 can first convert the shared secret s to a point on $E(F_q)$, and this point can be denoted as S. The user can then choose a random number x, where 1<x<r−1, and can calculate X=xS (elliptic curve scalar multiplication). The quantity x is the user's short term private key (or second private key) of the short term key pair (also called its short term authentication key pair), and X is the user's short term public key (or second public key).

The user 100 can then send (step 110) the second public key X and the first public key A to the host system 102 along with first auxiliary data ('Aux Data$_D$'). As discussed further below, the first auxiliary data will be used in generating a key confirmation value. The first auxiliary data can be essentially any data string such as a random data string, or it can be other useful data, such as device configuration information that can be used by the host system in configuring one or more devices at the host system's end. Its size is agreed upon in advance by the communicating parties.

The host system 102 receives the long term and short term public keys of the user 100 and recalls the shared secret s (step 112). The host system can generate its own long term key pair (step 114) by picking a random number b, where 1<b<r−1 and by calculating B=bP (elliptic curve scalar multiplication), where b is the host system's long term private key (or third private key), B is the host system's long term public key (or third public key), and P and r are as described above. Thus, in this example, the host system's long term public key is also generated using an elliptic curve calculation. The host system 102 can then securely store b and B. Of course, various steps can occur in any suitable order, e.g., the host system can calculate its long term public and private keys prior to receiving any public key information from the user 100.

To generate its short term key pair (step 114), the host system can first convert the shared secret s to a point on $E(F_q)$, and this point can be denoted as S. Since the user 100 and the host system 102 are operating in framework of shared parameters, the user 100 and host system 102 both generate the same value for S. The host system can then choose a random number y, where $1<y<r-1$, and can calculate $Y=yS$ (elliptic curve scalar multiplication). The quantity y is the host system's short term private key (or fourth private key) of the short term key pair (also called its short term authentication key pair), and Y is the host system's short term public key (or fourth public key).

The host system 102 can then calculate (step 116) a master key (or master secret) using the user's long term and short term public keys (first and second public keys) using the following exemplary calculation:

Calculate master key (e.g., by host system):
$k_1 = yX$;
$k_2 = bA$;
if $k_1 = 0, 1, -1$, then set $k_1$=random number;
if $k_2 = 0, 1, -1$, then set $k_2$=random number; and
$(k, k_{conf}) = SHA\text{-}512(k_1 \| k_2)$.

In the last of the above-noted steps, SHA-512 refers to the 512 bit "secure hash algorithm" that is known to those of ordinary skill in the art, and '$\|$' is an agreed upon concatenation function (see Federal Information Processing Standards Publication 180-2, "Secure Hash Standard", Aug. 1, 2002, located at http://csrc.nist.gov/publications/fips/fips180-2/fips180-2withchangenotice.pdf). Of course, other secure hash algorithms known in the art, such as those that utilize a different number of bits could also be used. The reference to $(k, k_{conf})$ means the first half of the result (first 256 bits) from the SHA-512 calculation is the calculated master secret key k, and the second half of the result (second 256 bits) is a quantity $k_{conf}$ that will be used in calculating the host system's key confirmation value $h_B$ (or test string) as discussed below. The steps at which k1 and k2 are tested to check whether either of them is equal to 0, 1 or −1 is similar to the check made at step 314 of FIG. 6 discussed previously to test whether there is a possible attack being staged. If the condition is met, such that either or both of k1 and k2 are set to random numbers, the calculated master key k will not match the user's master key, and two-way secure communication based upon a shared master (secret) key will not occur. Of course, the process could simply be aborted at this stage if the condition is met.

The host system 102 can calculate its key confirmation value $h_B$ (step 116) using the following calculation:

$h_B = HMAC\text{-}256_{k_{conf}}(\text{Aux Data}_D \| \text{Aux Data}_B \| A \| B \| X \| Y \| ASCII_1)$.

In this calculation, HMAC-256 refers to the 256 bit "hashed message authentication code" algorithm known to those of ordinary skill in the art (see "HMAC: Keyed-Hashing for Message Authentication", H. Krawczyk et al., Network Working Group Request for Comments: 2104, February 1997, 11 pages, accessible from the Internet at http://www-.faqs.org/rfcs/rfc2104.html). Of course, other versions of a hashed message authentication code, such as those that use a different number of bits, could also be used. The quantity $k_{conf}$ (referred to previously) is a bit string provided as input to the HMAC-256 algorithm. Aux Data$_D$ is the first auxiliary data provided by the user 100 as described above. Aux Data$_B$ refers to second auxiliary data generated by the host system.

The second auxiliary data can be essentially any data string such as a random data string, or it can be other useful data, such as device configuration information that can be used by the user in configuring one or more devices at the user's end. Its size is agreed upon in advance by the communicating parties and is the same size as the first auxiliary data. The symbol '$\|$' is an agreed upon concatenation function. A, X, B, and Y are the first through fourth public keys, and $ASCII_1$ is any predetermined ASCII code (e.g., for the letter "B") programmed into the argument of the HMAC algorithm.

The host system 102 can then send its short term public key (fourth public key) Y, long term public key (third public key) B, and key confirmation value (test string) $h_B$ to the user 10 (step 116). The host system 102 can also send its second auxiliary data (Aux Data$_B$) to the user 102 at this stage. After receiving this information (step 118), the user can perform its calculation of the master key.

The user 100 can perform its calculation (step 120) of the master key (or master secret) based upon the host system's long term and short term public keys (third and fourth public keys) using the following exemplary calculation:

Calculate master key (e.g., by user):
$k_1 = xY$;
$k_2 = aB$;
if $k_1 = 0, 1, -1$, then set k1=random number;
if $k_2 = 0, 1, -1$, then set $k_2$=random number; and
$(k, k_{conf}) = SHA\text{-}512(k_1 \| k_2)$.

In the last of the above-noted steps, SHA-512 refers to the 512 bit "secure hash algorithm" that is known to those of ordinary skill in the art, and '$\|$' is an agreed upon concatenation function. The reference to $(k, k_{conf})$ means the first half of the result (first 256 bits) from the SHA-512 calculation is the calculated master secret key k, and the second half of the result (second 256 bits) is the quantity $k_{conf}$ that will be used in calculating the users key confirmation value $h_A$ (or test string) as discussed below. Based on the above, it is apparent that the user's calculations are intended to produce the same values for k and $k_{conf}$ as produced by the host system's calculations.

The user 100 can then check (step 120) the host system's key confirmation value (test string) according to the following test:

if $h_B != HMAC\text{-}256_{k_{conf}}(\text{Aux Data}_D \| \text{Aux Data}_B \| A \| B \| X \| Y \| ASCII_1)$, then abort.

As discussed above, the quantity $ASCII_1$ is a predetermined ASCII code. It is not only programmed into the argument of the HMAC algorithm at the host system's end for generating $h_B$, but also is programmed into argument of the HMAC algorithm at the user's end for checking $h_B$. The symbol "!=" means "not equal to" as known to those of ordinary skill in the art.

The user 100 can then generate its own key confirmation value (test string) $h_A$ that is different from the host system's key confirmation value $h_B$ (step 122) according to the following exemplary calculation:

$h_A = HMAC\text{-}256_{k_{conf}}(\text{Aux Data}_D \| \text{Aux Data}_B \| A \| B \| X \| Y \| ASCII_2)$ In this calculation, the various quantities are as described above, and $ASCII_2$ is a another predetermined ASCII code (e.g., for the letter "A") programmed into the argument of the HMAC algorithm for generating $h_A$. $ASCII_2$ can be set to a different value than $ASCII_1$ to ensure that $h_A$ is not the same as $h_B$. The user 100 can then send $h_A$ to the host system 102 (step 122).

The host system 102 can then check (step 124) the user's key confirmation value (test string) according to the following test:

if $h_A != HMAC\text{-}256_{k_{conf}}(\text{Aux Data}_D \parallel \text{Aux Data}_B \parallel A \parallel B \parallel X \parallel Y \parallel ASCII_2)$, then abort.

To carry out this calculation, it is evident that the predetermined ASCII code $ASCII_2$ is programmed into the argument of the HMAC algorithm at the host system's end for checking $h_A$. If the user 100 (e.g., mobile station) makes more than a predetermined number (e.g., 10) of failed attempts, then the host system 102 can deny service to that user.

Finally, the user 100 can zero out the quantities s, x, $k_1$, $k_2$, and $k_{conf}$, and can securely store B (host system's long-term public key) and k (shared master key). Likewise, the host system 102 can zero out the quantities s, y, $k_1$, $k_2$, and $k_{conf}$, and can securely store A (user's long-term public key) and k (shared master key).

A discussion of several security considerations with respect to the above approach is now provided.

Eavesdropping Attack

The shared secret is a component of $k_1 = yX = xY = xyS$. The attacker is faced with calculating xyS knowing only X and Y. This is a Diffie-Hellman problem and is assumed to be hard.

Man-in-the-Middle Attack

Diffie-Hellman key agreements are traditionally prone to man-in-the-middle attacks. However, the base points used in the protocol are the shared secret key. To mount a man-in-the-middle attack, all parties must be using the same base point. Since the attacker does not know the shared secret key he will not be able to successfully calculate $k_1$, and hence cannot calculate k.

Impersonating a Mobile Station

Since an attacker does not know the secret s, he or she must send X=xP, instead of xS, to the host system. The host system will calculate $k_1 = yX = yxP$. To calculate the same key, the attacker needs to determine y from Y. This is the discrete logarithm problem and is assumed to be hard.

Impersonating a Host System

Since an attacker does not know the secret s, he or she must send Y=yP, instead of yS, to the user (e.g., mobile station). The user's device will calculate $k_1 = xY = xyP$. To calculate the same key the attacker needs to determine x from X. This is the discrete logarithm problem and is assumed to be hard.

Preventing an Offline Dictionary Attack

The best position to attack the password is to impersonate the mobile station, as the host system sends the first key confirmation value. This allows the attacker to try different passwords, and check if he or she has made the correct choice.

Assume the attacker sends X=xP, instead of xS, to the host system. The host system will reply with Y=xS and calculate $k_{1\ HOST} = yX = yxP$. Meanwhile, the attacker will calculate $k_{1\ attacker} = xY = yxS = yxzP$, for some z such that S=zP. Using the key confirmation value $h_B$, the attacker needs to find a value w such that $wk_{1\ attacker} = wxY = wyxzP = xyP = k_{1\ HOST}$. Notice however, that $w = z^{-1}$ mod r. Therefore finding w amounts to finding z, which corresponds to solving the discrete logarithm problem for S. This is assumed to be hard.

Preventing an Online Dictionary Attack

The best position to attack the password is to impersonate the mobile station, as the Host System sends the first key confirmation value. During each run the mobile station tries a different password, and checks if he or she has made the correct choice against $h_B$. This is averted by limiting the mobile station to a predetermined number (e.g., 10) of attempts to determine the correct secret s.

Small Subgroup Attack

A small subgroup attack is one in which an attacker tries to force the key agreement result to come from a small set of values. For example if the attacker chooses X to be the point at infinity then $k_1$ would be the point at infinity no matter what the host system chose for Y. Therefore by checking that X is not the point at infinity, one or minus one this threat is averted.

Regeneration of New Master Key (Re-Keying using MQV)

As noted above, regeneration of a new master key (re-keying) in the present exemplary framework can be done using the MQV algorithm known to those of ordinary skill in the art. In the example below, reference will be made to certain general process steps of previously described FIGS. 8 and 9, a modifications thereto.

As shown in FIG. 8, a re-key request is received by the user 100, or the user 100 decides to cut a new key (step 430). Of course, step 430 could be executed by the service provider instead of the user.

The user generates a new short-term encryption key pair (step 432). According to an exemplary mathematical calculation, the user 100 chooses a new random number x to be its new private short term authentication key (new second private key), where $1 < x < r-1$, and calculates X=xP, where P is as previously described, and where X is the user's new public short term authentication key, which can also be referred to as a new public short term encryption key (new second public key). The user 100 sends X to the host system 102 (step 434) and also sends first auxiliary data ($\text{Aux Data}_D$) along with X, where the first auxiliary data is as previously described.

The host system 102 receives the user's new public short term authentication key (step 460) and generates its own new short term authentication (or encryption) key pair (step 462). According to an exemplary calculation, the host system chooses a new random number y to be its new private short term authentication key (new fourth private key), where $1 < y < r-1$, and calculates Y=yP, where Y is the host system's new public short term authentication key (new fourth public key).

The host system 102 can then calculate (step 464) a new master key using the following exemplary calculation:

Calculate new master key (e.g., by host system):
$S_B = (y + \overline{Y}b) \bmod r$;
$Z = S_B(X + \overline{X}A)$;
if Z is the point of infinity, then choose a new y and re-calculate $s_B$ and Z;
$(k, k_{conf}) = SHA\text{-}512(x_Z)$, where $x_Z$ is the x-coordinate of Z.

In the above, $\overline{X}$ and $\overline{Y}$ are calculated from X and Y, respectively, using a known approach in the MQV protocol. Namely, to calculate $\overline{X}$, the abscissa (x-coordinate) value of X is obtained (noting that X is an elliptic curve point having an x-coordinate value and a y-coordinate value), the leading half (left half) of the abscissa's bit values are dropped, and a leading "1" is inserted in place of the dropped bits. The calculation of $\overline{Y}$ from Y is done in the same manner. The first half of the bits of the result of the SHA calculation is the master key k, and the second half of the bits is the value of $k_{conf}$, such as described previously. In this example, separate k1 and k2 values are not generated during re-keying, and a step analogous to step 466 is not carried out.

The host system 102 can calculate (step 470) its key confirmation value $h_B$ (test string) using the following calculation in the manner discussed previously:

$$h_B = HMAC\text{-}256_{k_{conf}}(\text{Aux Data}_D \| \text{Aux Data}_B \| A \| B \| X \| Y \| ASCII_1).$$

The host system 102 then sends Y and $h_B$ (step 472) to the user 100 along with the second auxiliary data (Aux Data$_B$). After receiving this information, the user can perform its calculation of the new master key.

The user 100 can perform its calculation (step 440) of the new master key (or master secret) using the following exemplary calculation:

Calculate new master key (e.g., by user):

$s_A = (x + \bar{X}a) \bmod r$;

$Z = s_A(Y + \bar{Y}B)$;

if Z is the point of infinity, then set Z to a random point of $E(F_q)$;

$(k, k_{conf}) = SHA\text{-}512(x_Z)$, where $x_Z$ is the x-coordinate of Z.

In the above, $\bar{X}$ and $\bar{Y}$ are calculated from X and Y as described previously. Other aspects of the calculation are like those previously described. Also, in this example, separate k1 and k2 values are not generated during re-keying, and a step analogous to step 442 is not carried out. During this time, if a received message cannot be decrypted with the current master key or with the previous master key (if still available), then pending master key (i.e., the newly calculated quantity k intended to become the new master key) can be tried.

The user 100 can then check (step 466) the host system's key confirmation value (test string) according to the following test, such as described previously:

if $h_B != HMAC\text{-}256_{k_{conf}}(\text{Aux Data}_D \| \text{Aux Data}_B \| A \| B \| X \| Y \| ASCII_1).$ then abort.

If the quantity $h_B$ matches the expected value, the user 100 sets the newly calculated value of k to be the new master key.

The user 100 can then generate its own key confirmation value (test string) $h_A$ that is different from the host system's key confirmation value $h_B$ (step 452) according to the following exemplary calculation, as previously described:

$$h_A = HMAC\text{-}256_{k_{conf}}(\text{Aux Data}_D \| \text{Aux Data}_B \| A \| B \| X \| Y \| ASCII_2).$$

The user 100 can then send $h_A$ to the host system 102 (step 454).

The host system 102 can then check (step 474) the user's key confirmation value (test string) according to the following test:

if $h_A != HMAC\text{-}256_{k_{conf}}(\text{Aux Data}_D \| \text{Aux Data}_B \| A \| B \| X \| Y \| ASCII_2),$ then abort.

If the quantity $h_A$ matches the expected value, the host system 102 sets the newly calculated value of k to be the new master key.

Finally, the user 100 can zero out the quantities $s_A$, x, and $k_{conf}$ and can securely store k (shared master key). Likewise, the host system 102 can zero out the quantities $s_B$, y, and $k_{conf}$ and can securely store k (shared master key).

A discussion of several security considerations with respect to the above approach is now provided.

Man-in-the-Middle Attack.

According to the National Institute of Standards and Technology (NIST), this attack will not be successful against an MQV key generation scheme. As long as the long-term private keys a and b remain secret there can be no man-in-the-middle attack. (See, *NIST Special Publication* 800-56: *Recommendation on Key Establishment schemes, Draft* 2.0, January 2003, National Institute of Standards and Technology, available at http://csrc.nist.gov/CryptoToolkit/tkkevmgmt.html).

Perfect Forward Secrecy

Notice that the shared secret varies from one key establishment transaction to the next. If both the static (long term) and ephemeral (short term) private keys from a particular transaction are lost, the shared secrets from other legitimate transactions are not compromised because different ephemeral private keys are used in each transaction.

Masquerade Attack

NIST indicates that if an attacker compromises a victim's long-term private key, in MQV, the attacker cannot masquerade as a third party to the victim. (See, *NIST Special Publication* 800-56: *Recommendation on Key Establishment schemes, Draft* 2.0, January 2003, National Institute of Standards and Technology, available at http://csrc.nist.gov/CryptoToolkit/tkkeymgmt.html). The ability to prevent the masquerade attack is an advantage of the above-described approach utilizing MQV in re-keying or over-the-air key generation, since if this feature is missing, and if the host system's long-term private key is compromised, the attacker holding the key can potentially masquerade as any mobile station to the host system.

Having described the above-noted additional exemplary first and second protocols for key generation and re-keying, respectively, further exemplary aspects will now be described. For example, a method for secure bidirectional communication between two systems can be used. A first key pair and a second key pair are generated, the latter including a second public key that is generated based upon a shared secret. First and second public keys are sent to a second system, and third and fourth public keys are received from the second system. The fourth public key is generated based upon the shared secret. A master key for encrypting messages is calculated based upon a first private key, a second private key, the third public key and the fourth public key. For re-keying, a new second key pair having a new second public key and a new second private key is generated, and a new fourth public key is received. A new master key is calculated using elliptic curve calculations using the new second private key and the new fourth public key.

As another example, a first system is used for establishing a secure bidirectional communication path to a second system for exchanging one or more messages. The first system includes a memory and a processing unit coupled to the memory. The processing unit is configured to execute steps of: generating a first key pair having a first public key and a first private key; generating a second key pair having a second public key and a second private key, the second public key being generated based upon a shared secret known to the first system and the second system; sending the second public key and the first public key to the second system; receiving a third public key and a fourth public key generated by the second system, the fourth public key being generated based upon the shared secret; calculating a first master key based upon the first private key, the second private key, the third public key and the fourth public key, wherein the first master key is configured to be used in encryption of one or more messages;

generating a new second key pair having a new second public key and a new second private key; receiving a new fourth public key from the second system, and calculating a new master key based upon the first private key, the new second private key, the third public key, and the new fourth public key using an elliptic curve calculation.

According to another aspect, any form of computer readable carrier can contain processing instructions adapted to a cause a processing unit to execute the methods described herein. The computer readable carrier can be any suitable type of carrier, such as solid-state memory (e.g., read only memory (ROM), random access memory (RAM), etc.), magnetic memory, optical memory, other type of memory, or modulated waves/signals (such as radio frequency, audio frequency, or optical frequency modulated waves/signals) containing an appropriate set of computer instructions that would cause a processing unit to carry out the techniques described herein.

According to another aspect, a computer readable carrier contains processing instructions adapted to cause a processing unit to execute the above-noted steps.

An exemplary password-based encryption communication system, in wireless or wired environments, having, if desired, perfect forward secrecy has been described. It includes using a long-term key-pair in combination with a short-term authentication key-pair, generated using a shared secret, to allow for the implementation of perfect forward secrecy. The long-term public key is piggy-backed with the authentication public key to enable an authentic exchange of long-term keys. This enables the corresponding party that is in possession of the shared secret, to receive and be able to use the long-term public key.

Having described in detail the exemplary embodiments of the present invention, including exemplary methods of operation, it is to be understood that the operations described herein could be carried out with different elements and steps. The exemplary embodiments are presented only by way of example and are not meant to limit the scope of the present invention, which is defined by the following claims.

What is claimed:

1. A method carried out by a first system for establishing a secure bidirectional communication path between the first system and a second system for an exchange of one or more messages, the method comprising:
   generating a first key pair having a first public key and a first private key;
   generating a second key pair having a second public key and a second private key, the second public key being generated based upon a shared secret known to the first system and the second system;
   sending the second public key and the first public key to the second system;
   receiving a third public key and a fourth public key generated by the second system, the fourth public key being generated based upon the shared secret;
   calculating a first master key based upon the first private key, the second private key, the third public key and the fourth public key, wherein the first master key is configured to be used in encryption of one or more messages;
   generating a new second key pair having a new second public key and a new second private key;
   receiving a new fourth public key from the second system, and calculating a new master key based upon the first private key, the new second private key, the third public key, and the new fourth public key using an elliptic curve calculation.

2. The method of claim 1, further comprising:
   generating a first test string;
   sending the first test string to the second system;
   receiving a second test string generated by the second system; and
   authenticating the second system with the second test string and either the first master key or the new master key.

3. The method of claim 2, further comprising a step of receiving a data payload having a Universal Description, Discovery and Integration (UDDI) service entry prior to the step of receiving a second test string generated by the second system.

4. The method of claim 1, wherein the first system comprises a wireless mobile device.

5. The method of claim 4, wherein the second system comprises a host system offering services.

6. The method of claim 4, wherein the shared secret is communicated over a secure out-of-band channel.

7. The method of claim 6, wherein the shared secret comprises a personal identification number (PIN) automatically generated by the host system.

8. The method of claim 6, wherein the shared secret is received from the second system through a web interface following a request by the first system.

9. The method of claim 5, wherein the exchange of one or more messages comprises an exchange of e-mail messages, http-based XML messages, or http-based WML messages.

10. The method of claim 5, wherein the wireless mobile device and the host system are addressed with e-mail addresses or IP addresses.

11. The method of claim 5, wherein an elliptic curve calculation is used in calculating the first master key.

12. The method of claim 1, wherein the first system is a host system offering services, and wherein the second system is a mobile wireless device.

13. The method of claim 1, wherein calculating the first master key utilizes a secure hash algorithm (SHA).

14. The method of claim 1, wherein calculating the new master key utilizes a Menezes-Qu-Vanstone (MQV) algorithm.

15. The method of claim 2, wherein generating the first test string utilizes a hashed message authentication code (HMAC).

16. The method of claim 1, further comprising encrypting one or messages using either the first master key or the new master key.

17. A first system for establishing a secure bidirectional communication path to a second system for exchanging one or more messages, comprising:
   means for generating a first key pair having a first public key and a first private key;
   means for generating a second key pair having a second public key and a second private key, the second public key being generated based upon a shared secret known to the first system and the second system;
   means for sending the second public key and the first public key to the second system;
   means for receiving a third public key and a fourth public key generated by the second system, the fourth public key being generated based upon the shared secret;
   means for calculating a first master key based upon the first private key, the second private key, the third public key and the fourth public key, wherein the first master key is configured to be used in encryption of one or more messages;

means for generating a new second key pair having a new second public key and a new second private key;

means for receiving a new fourth public key from the second system, and means for calculating a new master key based upon the first private key, the new second private key, the third public key, and the new fourth public key using an elliptic curve calculation.

18. A first system for establishing a secure bidirectional communication path to a second system for exchanging one or more messages, comprising:

a memory; and a processing unit coupled to the memory, wherein the processing unit is configured to execute steps of:

generating a first key pair having a first public key and a first private key;

generating a second key pair having a second public key and a second private key, the second public key being generated based upon a shared secret known to the first system and the second system;

sending the second public key and the first public key to the second system;

receiving a third public key and a fourth public key generated by the second system, the fourth public key being generated based upon the shared secret;

calculating a first master key based upon the first private key, the second private key, the third public key and the fourth public key, wherein the first master key is configured to be used in encryption of one or more messages;

generating a new second key pair having a new second public key and a new second private key;

receiving a new fourth public key from the second system, and calculating a new master key based upon the first private key, the new second private key, the third public key, and the new fourth public key using an elliptic curve calculation.

19. Computer-readable storage medium or mediums encoded with instructions that cause a device with a processor to perform a method carried out by a first system for establishing a secure bidirectional communication path between the first system and a second system for an exchange of one or more messages, said method comprising:

generating a first key pair having a first public key and a first private key;

generating a second key pair having a second public key and a second private key, the second public key being generated based upon a shared secret known to the first system and the second system;

sending the second public key and the first public key to the second system;

receiving a third public key and a fourth public key generated by the second system, the fourth public key being generated based upon the shared secret;

calculating a first master key based upon the first private key, the second private key, the third public key and the fourth public key, wherein the first master key is configured to be used in encryption of one or more messages;

generating a new second key pair having a new second public key and a new second private key; and receiving a new fourth public key from the second system, and calculating a new master key based upon the first private key, the new second private key, the third public key, and the new fourth public key using an elliptic curve calculation.

\* \* \* \* \*

UNITED STATES PATENT AND TRADEMARK OFFICE
CERTIFICATE OF CORRECTION

PATENT NO. : 7,646,872 B2  Page 1 of 1
APPLICATION NO. : 11/118236
DATED : January 12, 2010
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1293 days.

Signed and Sealed this

Sixteenth Day of November, 2010

David J. Kappos
*Director of the United States Patent and Trademark Office*